United States Patent
Canich et al.

(10) Patent No.: US 12,503,665 B2
(45) Date of Patent: Dec. 23, 2025

(54) ETHYLENE-PROPYLENE BRANCHED COPOLYMERS AS VISCOSITY MODIFIERS

(71) Applicants: ExxonMobil Chemical Patents Inc., Houston, TX (US); Chevron Oronite Company LLC, San Ramon, CA (US)

(72) Inventors: Jo Ann M. Canich, Houston, TX (US); Jingwen Zhang, Houston, TX (US); Sara Yue Zhang, Danville, CA (US); David L. Morgan, Pleasanton, CA (US); John R. Hagadorn, Houston, TX (US); Peijun Jiang, Katy, TX (US); Maryam Sepehr, San Ramon, CA (US)

(73) Assignees: ExxonMobil Chemical Patents Inc., Houston, TX (US); Chevron Oronite Company LLC, San Ramon, CA (US)

( * ) Notice: Subject to any disclaimer, the term of this patent is extended or adjusted under 35 U.S.C. 154(b) by 0 days.

(21) Appl. No.: 18/557,771

(22) PCT Filed: May 11, 2022

(86) PCT No.: PCT/US2022/028735
§ 371 (c)(1),
(2) Date: Oct. 27, 2023

(87) PCT Pub. No.: WO2022/240965
PCT Pub. Date: Nov. 17, 2022

(65) Prior Publication Data
US 2024/0240100 A1    Jul. 18, 2024

Related U.S. Application Data

(60) Provisional application No. 63/188,726, filed on May 14, 2021.

(51) Int. Cl.
*C10M 119/02* (2006.01)
*C08F 210/02* (2006.01)
(Continued)

(52) U.S. Cl.
CPC ......... *C10M 119/02* (2013.01); *C08F 210/02* (2013.01); *C08F 210/06* (2013.01);
(Continued)

(58) Field of Classification Search
CPC .............. C10M 119/02; C10M 169/02; C10M 2203/003; C10M 2205/024; C10M 143/04;
(Continued)

(56) References Cited

U.S. PATENT DOCUMENTS

| 3,778,375 A | 12/1973 | Braid et al. |
| 3,779,928 A | 12/1973 | Schlicht |

(Continued)

FOREIGN PATENT DOCUMENTS

| EP | 0638611 A1 | 2/1995 |
| EP | 0573120 B1 | 11/1998 |

(Continued)

OTHER PUBLICATIONS

U.S. Appl. No. 62/357,033, filed Jun. 30, 2016.
(Continued)

*Primary Examiner* — Cephia D Toomer
(74) *Attorney, Agent, or Firm* — Eric D. Babych; Barnes & Thornburg LLP

(57) ABSTRACT

The present disclosure relates to lubricant compositions comprising a branched copolymer and methods for making such compositions. Lubricant compositions of the present disclosure comprise an oil and a copolymer and have a high temperature high shear (HTHS) viscosity of about 5 or less, shear stability index (30 cycles) of from about 2% to about 80%, a ratio of thickening efficiency to shear stability index (30 cycles) of from about 1:2 to about 1:30, a kinematic viscosity at 100° C. of from about 3 cSt to about 30 cSt, and a thickening efficiency of about 1 or more. In another class (Continued)

SSI vs. HTHS for commercial linear reference samples (OCPs) and inventive polymers of embodiments, the present disclosure provides a lubricant composition comprising a first and a second copolymers wherein the first copolymer has an ethylene content higher than that of the second copolymer, and wherein at least one of the two copolymers is a long chain branched ethylene copolymer.

25 Claims, 4 Drawing Sheets

(51) Int. Cl.
| | | |
|---|---|---|
| C08F 210/06 | (2006.01) | |
| C10M 169/02 | (2006.01) | |
| C10N 20/00 | (2006.01) | |
| C10N 20/04 | (2006.01) | |
| C10N 30/00 | (2006.01) | |
| C10N 30/02 | (2006.01) | |

(52) U.S. Cl.
CPC .... C10M 169/02 (2013.01); *C10M 2203/003* (2013.01); *C10M 2205/024* (2013.01); *C10N 2020/019* (2020.05); *C10N 2020/04* (2013.01); *C10N 2030/02* (2013.01); *C10N 2030/68* (2020.05)

(58) Field of Classification Search
CPC ...... C10M 2203/1006; C10M 2205/02; C10M 2205/022; C08F 210/02; C08F 210/06; C10N 2020/019; C10N 2020/04; C10N 2030/02; C10N 2030/68; C10N 2020/02; C10N 2020/071; C10N 2040/25
See application file for complete search history.

(56) References Cited

U.S. PATENT DOCUMENTS

| | | | |
|---|---|---|---|
| 3,852,205 | A | 12/1974 | Kablaoui et al. |
| 3,879,306 | A | 4/1975 | Kablaoui et al. |
| 3,932,290 | A | 1/1976 | Koch et al. |
| 3,933,659 | A | 1/1976 | Lyle et al. |
| 4,028,258 | A | 6/1977 | Kablaoui et al. |
| 4,105,571 | A | 8/1978 | Shaub et al. |
| 4,176,074 | A | 11/1979 | Coupland et al. |
| 4,344,853 | A | 8/1982 | Gutierrez et al. |
| 4,464,493 | A | 8/1984 | Joffrion |
| 5,041,584 | A | 8/1991 | Crapo et al. |
| 5,068,047 | A | 11/1991 | Chung et al. |
| 5,153,157 | A | 10/1992 | Hlatky et al. |
| 5,391,617 | A | 2/1995 | Olivier et al. |
| 5,447,895 | A | 9/1995 | Marks et al. |
| 5,453,410 | A | 9/1995 | Kolthammer et al. |
| 5,458,791 | A | 10/1995 | Rhodes et al. |
| 5,942,459 | A | 8/1999 | Sugano et al. |
| 6,211,105 | B1 | 4/2001 | Holtcamp |
| 6,841,502 | B2 | 1/2005 | Boussie et al. |
| 7,018,949 | B2 | 3/2006 | Boussie et al. |
| 7,087,686 | B2 | 8/2006 | Britovsek et al. |
| 7,087,690 | B2 | 8/2006 | Boussie et al. |
| 7,091,292 | B2 | 8/2006 | Boussie et al. |
| 7,256,296 | B2 | 8/2007 | Diamond et al. |
| 7,402,235 | B2 | 7/2008 | Huang |
| 7,964,681 | B2 | 6/2011 | Britovsek et al. |
| 7,973,116 | B2 | 7/2011 | Hagadorn et al. |
| 8,105,992 | B2 | 1/2012 | Schauder et al. |
| 8,394,902 | B2 | 3/2013 | Hagadorn et al. |
| 8,404,880 | B2 | 3/2013 | Kaji et al. |
| 8,658,556 | B2 | 2/2014 | Stewart |
| 8,674,040 | B2 | 3/2014 | Hagadorn et al. |
| 8,710,163 | B2 | 4/2014 | Hagadorn et al. |
| 8,975,209 | B2 | 3/2015 | Kaji et al. |
| 9,102,773 | B2 | 8/2015 | Hagadorn et al. |
| 9,315,593 | B2 | 4/2016 | Hagadorn |
| 9,340,630 | B2 | 5/2016 | Kaji et al. |
| 9,657,122 | B2 | 5/2017 | Tse et al. |
| 9,938,364 | B2 | 4/2018 | Canich et al. |
| 10,479,956 | B2 | 11/2019 | Ortiz et al. |
| 11,299,567 | B2 * | 4/2022 | Zhang ................ C10M 171/04 |
| 2014/0256893 | A1 | 9/2014 | Hagadorn et al. |
| 2014/0316089 | A1 | 10/2014 | Hagadorn et al. |
| 2015/0013481 | A1 | 1/2015 | Abbott, Jr. et al. |
| 2015/0025209 | A1 | 1/2015 | Canich et al. |
| 2015/0025210 | A1 | 1/2015 | Canich et al. |
| 2015/0141590 | A1 * | 5/2015 | Hagadorn ............ C10M 143/04 |
| | | | 526/348 |
| 2015/0141601 | A1 | 5/2015 | Hagadorn et al. |
| 2018/0002352 | A1 | 1/2018 | Hagadorn et al. |
| 2018/0020698 | A1 | 1/2018 | Zhu et al. |
| 2018/0201698 | A1 * | 7/2018 | Hagadorn ................ C08F 8/30 |
| 2018/0251586 | A1 * | 9/2018 | Canich ................ C08F 210/16 |
| 2018/0319907 | A1 * | 11/2018 | Hagadorn ............ C08F 4/6495 |
| 2020/0255562 | A1 * | 8/2020 | Canich ................ C08F 210/16 |
| 2020/0407474 | A1 | 12/2020 | Zhang et al. |
| 2021/0040250 | A1 | 2/2021 | Zhang et al. |

FOREIGN PATENT DOCUMENTS

| | | |
|---|---|---|
| WO | 1994007928 A1 | 4/1994 |
| WO | 1995014044 A1 | 5/1995 |
| WO | 1998043983 A1 | 10/1998 |

OTHER PUBLICATIONS

International Search Report and Written Opinion issued on Jul. 28, 2022 for corresponding PCT Application No. PCT/US2022/028735.
Baier, M. C.; Zuideveld, M. A.; Mechking, S. Angew. Chem. Int. Ed. 2014, 53, 2-25.
Diamond, G. M. et al. ACS Catal. 2011, 1, 887-900.
Gibson, V. C., Wass, D. F. Angew. Chem. Int. Ed. 1999, 38, 428-447.
International Search Report and Written Opinion Issued on Aug. 1, 2022 for corresponding PCT Application No. PCT/US2022/028709.
James C. Randall, "Methylene sequence distributions and average sequence lengths in ethylene-propylene copolymers," Macromolecules, 1978, 11, 33-36.
Randall, "A Review of High Resolution Liquid Carbon Nuclear Magnetic Resonance Characterization of Ethylene-Based Polymers," Polymer Reviews, 29:2, 201-5 317 (1989).
Sakuma, A., Weiser, M. S., Fujita, T. Polymer J. 2007, 39:3, 193-207.
Textbook of Polymer Chemistry, F.W. Billmeey, Jr., Interscience Publishers, New York, p. 221 et seq. (1957).
Chemical and Engineering News, 63(5), p. 27 (1985).
Cotts, P. M.; Guan, Z.; McCord, E.; Mclain, S. Macromolecules 2000, 33, 6945.
Davidson, N. S.; Fetters, L. J.; Funk, W. G.; Hadjichristidis, N.; Graessley, W. W. Macromolecules 1987, 20, 2614.
Fetters, L. J.; Graessley, W. W.; Krishnamoorti, R.; Lohse, D. J. Macromolecules 1997, 30, 4973.
Fetters, L. J.; Hadjichristidis, N.; Lindner, J. S.; Mays, J. W. J. Phys. Chem. Ref. Data 1994, 23, 619.
Girolami, Gregory S., "A Simple 'Back of the Envelope' Method for Estimating the Densities and Molecular Volumes of Liquids and Solids," Journal of Chemical Education, vol. 71, No. 11, Nov. 1994, pp. 962-964.
Graessley, W. W.; Krishnamoorti, R.; Balsara, N. P.; Butera, R. J.; Fetters, L. J.; Lohse, D. J.; Schulz, D. N.; Sissano, J. A Macromolecules 1994, 27, 3896.
Han, S. J.; Lohse, D. J.; Condo, P. D.; Sperling, L. H. J. Polym. Sci., Polym. Phys. Ed. 1999, 37, 2835.
Hayward, R. C.; Graessley, W. W. Macromolecules 1999, 32, 3502.
J. Vladimir Oliveira, C. Darive and J. C. Pinto, Ind. Eng. Chem. Res., 2000, vol. 29, p. 4627.
Kaminski, W.; Arndt, M. Adv. Polym. Sci. 1997, 127, 143.
Le Guillou, J. C .; Zinn-Justin, J. Phys. Rev. Lett. 1977, 39, 95.
Makio, H. and Fujita, T. Development and Application of FI Catalysts for Olefin Polymerization: Unique Catalysis and Distinc-

(56) References Cited

OTHER PUBLICATIONS tive Polymer Formation. Accounts of Chemical Research 2009, 42 (10), 1532-1544. https://doi.org/10.1021/ar900030a.

Mandelkern, L. Chapter 4 In Physical Properties of Polymers, 2nd ed.; Mark, J. E., et al., Eds.; American Chemical Society: Washington, DC, 1993.

Scholte, Th. G.; Meijerink, N. L. J.; Schoffeleers, H. M.; Brands, A. M. G. J. Appl. Polym. Sci. 1984, 29, 3763.

T. Sun, P. Brant, R. R. Chance, and W. W. Graessley, "Effect of short chain branching on the coil dimensions of polyolefins in dilute solution," Macromolecules, vol. 34, No. 19, pp. 6812-6820, 2001.

W. van Dam, T. Miller, G. Parsons: Optimizing Low Viscosity Lubricants for Improved Fuel Economy in Heavy Duty Diesel Engines. SAE Paper 2011-01-1206.

Wagner, H. L.; Hoeve, C. A. J. J. Polym. Sci. 1973, 11, 1189.

Wang, J.- S.; Porter, R. S.; Knox, J. R. Polym. J. 1978, 10, 619.

Wild, L. Adv. Polym. Sci. 1990, 98, 1.

Wu, C.-S., Ed. Handbook of Size Exclusion Chromatography; Dekker: New York, 1995.

Yamakawa, H. Modern Theory of Polymer Solutions, Harper & Row: New York, 1971.

\* cited by examiner

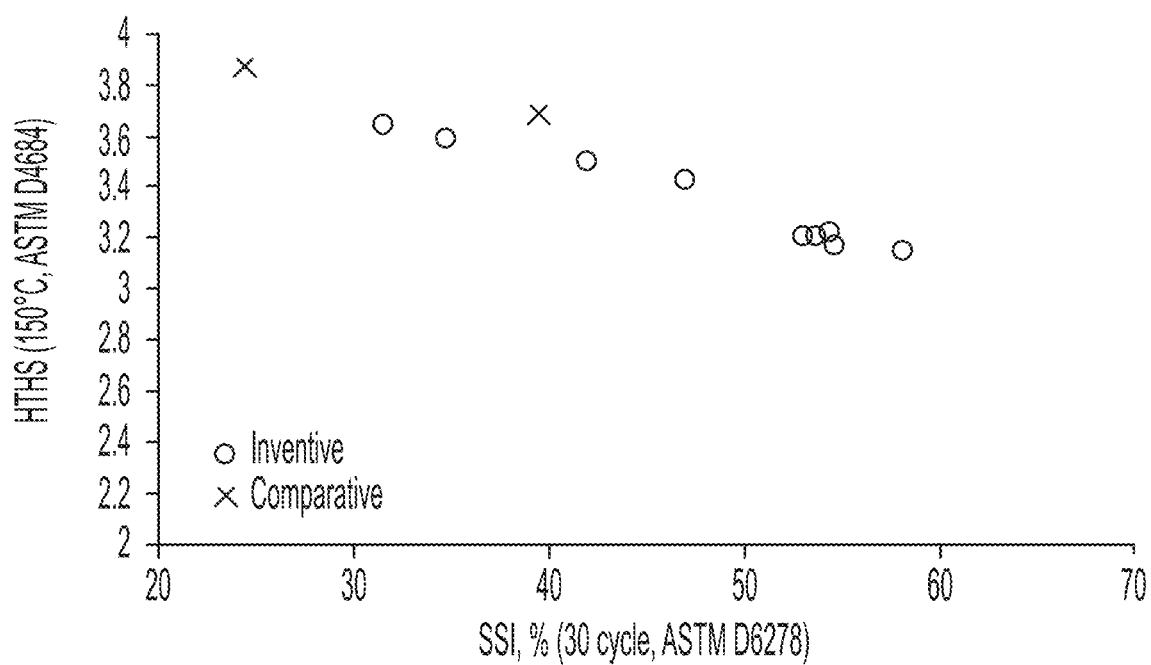
FIG. 1 SSI vs. HTHS for commercial linear reference samples (OCPs) and inventive polymers

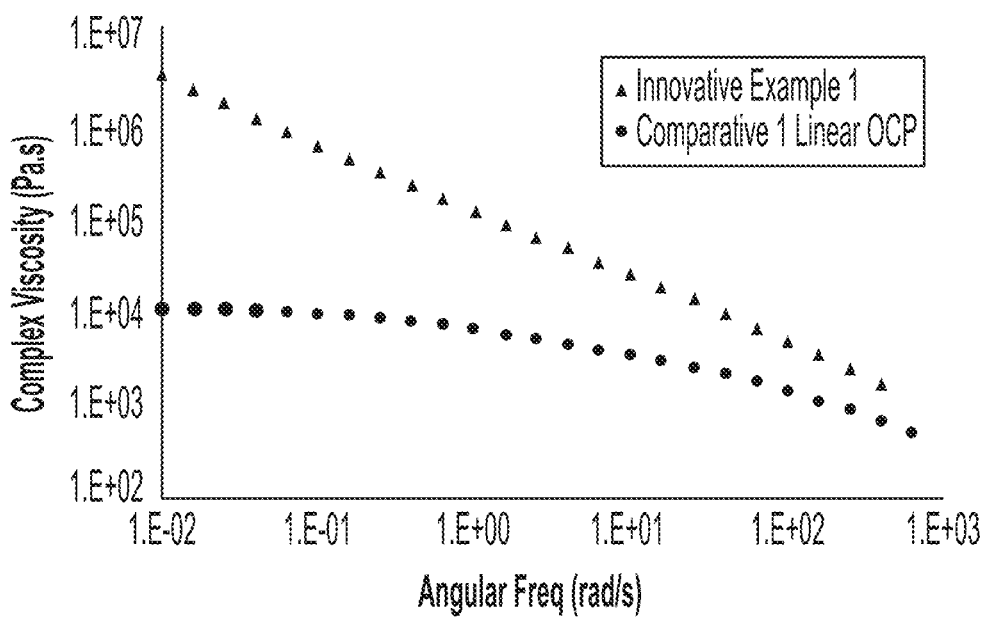
FIG. 2 Dynamic frequency sweep on neat polymers at 190°C for commercial linear OCP vs. inventive branch-on-branch EP, respectively.

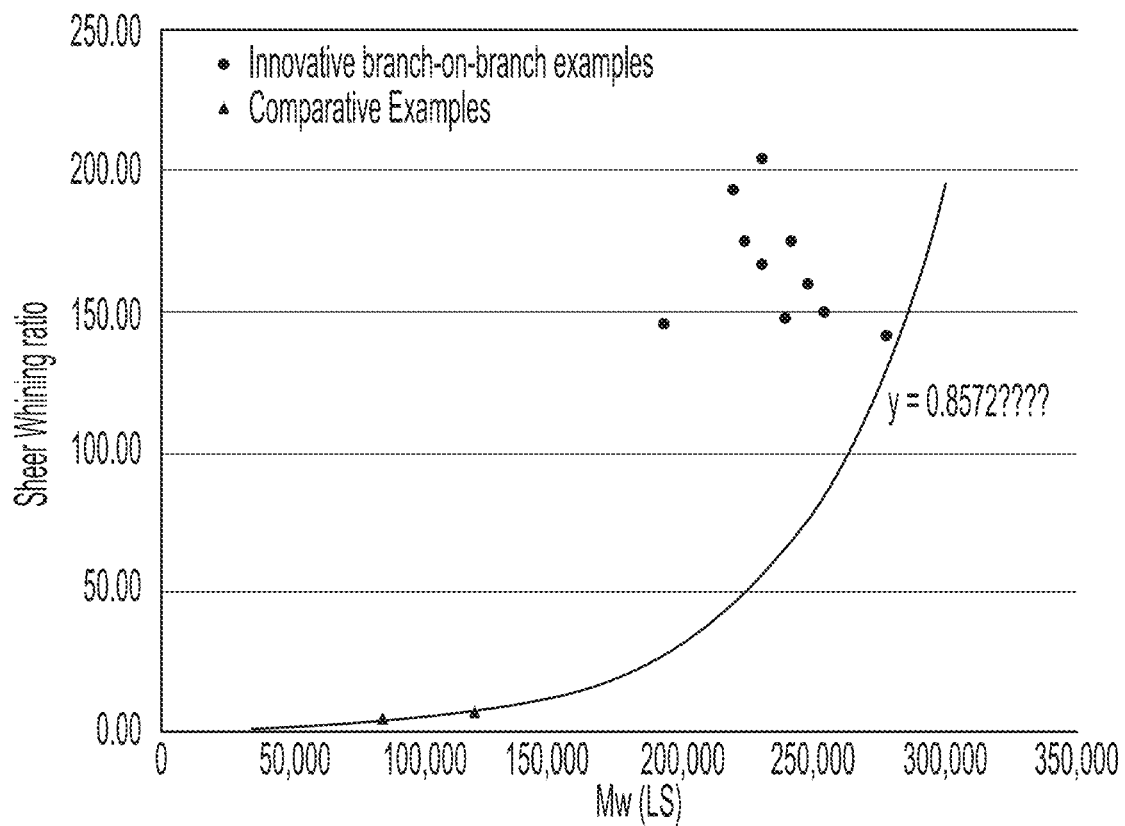
FIG. 3 Plot of polymer Mw (LS) vs. the shear thinning ratio where the shear thinning ratio is defined as the complex viscosity at a frequency of 0.1 rad/s divided the complex viscosity at a frequency of 1200 rad/s

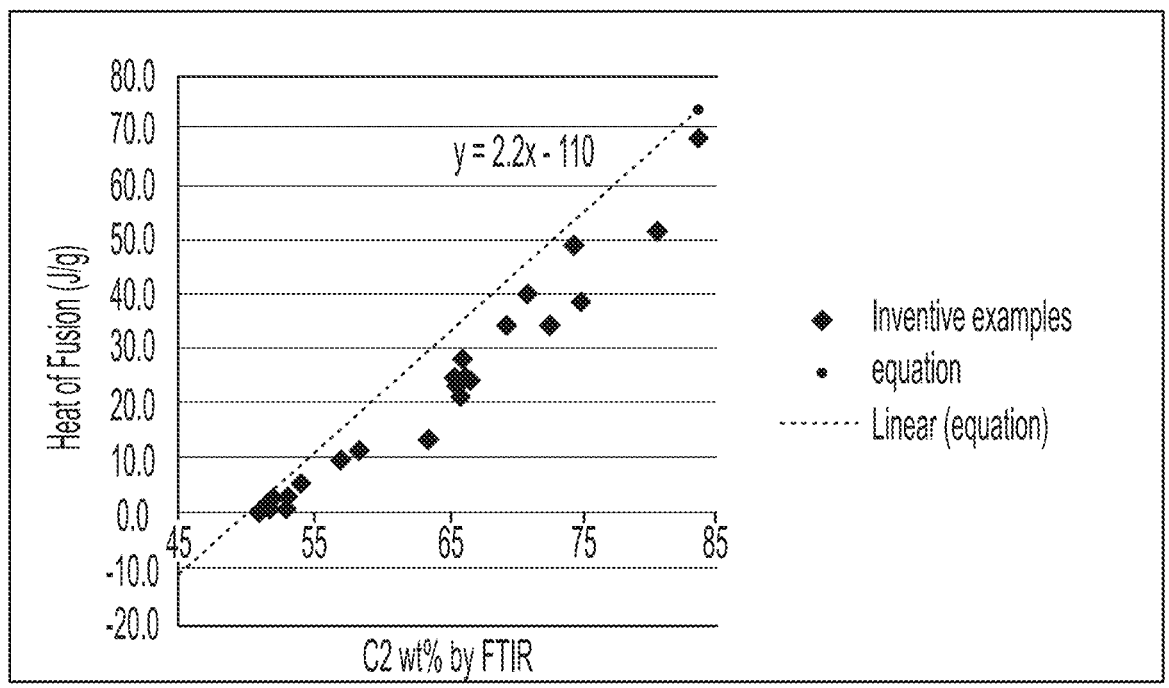
FIG. 4 Plot of ethylene (wt%) from FTIR vs. the Heat of Fusion (J/g) of the copolymer melting peak as measured by DSC

ETHYLENE-PROPYLENE BRANCHED COPOLYMERS AS VISCOSITY MODIFIERS

CROSS-REFERENCE TO RELATED APPLICATIONS

This application is a national stage application (under 35 U.S.C. § 371) of PCT/US2022/028735, filed May 11, 2022, which claims the benefit under 35 U.S.C. § 119(e) of the filing date of U.S. Provisional Patent Application No. 63/188,726, filed on May 14, 2021, disclosures of which are incorporated herein by reference in its entirety.

FIELD

The present disclosure relates to lubricant compositions comprising a branched copolymer and methods for making such compositions.

BACKGROUND

Lubrication fluids are applied between moving surfaces to reduce friction, thereby improving efficiency and reducing wear. Lubrication fluids also often function to dissipate the heat generated by friction between moving surfaces in contact with each other. One type of lubrication fluid is a petroleum-based lubrication oil used for internal combustion engines. Lubrication oils contain additives that improve performance of the oil by controlling oxidation, friction, wear and viscosity under engine operating conditions. In general, the viscosity of lubrication oils and fluids is inversely dependent upon temperature. When the temperature of a lubrication fluid is increased, the viscosity generally decreases, and when the temperature is decreased, the viscosity generally increases.

Viscosity modifiers, when added to lubricant oils, reduce the tendency of the oil to change its viscosity with temperature in order to improve its viscosity index (VI) and flow characteristics. Improving VI helps in maintaining constant the flow properties of the lubricant oil that forms a protective oil film. This means a high enough viscosity to avoid damage on engine parts (such as corrosion or wear) when the temperature rises because of the engine heat and a low enough viscosity at low temperature to facilitate the cold start and pumping of the lubricant oil.

To make sure the viscosity modifier (VM) is used in a cost-effective way, polymer thickening efficiency is important. Thickening efficiency (TE) as described in U.S. Pat. No. 8,105,992 is a relative measure of how much viscosity gain can be achieved by dissolution a polymer in a given reference oil. A polymer having a high value of TE indicates that it is a potent thickener.

A polymer's shear stability index (SSI) is used to measure its resistance to mechanical degradation under shearing stress. The tendency of a polymeric molecule to undergo chain scission when subjected to repeated mechanical forces is dictated by its molecular weight, molecular weight distribution, ethylene content, and degree of long-chain branching. A polymer's shear stability index (SSI) is a measure of the percent viscosity loss at 100° C. of polymer-containing fluids when evaluated using a diesel injector apparatus procedure that uses European diesel injector test equipment. The higher the SSI, the less stable the polymer, i.e., the more susceptible it is to mechanical degradation. Shear stability of the polymer is one of the important criteria that determines its suitability as viscosity modifier.

Polymer containing lubricant oils may also undergo temporary viscosity loss or shear thinning under engine operating condition. One measure of this effect is high temperature and high shear (HTHS) viscosity. HTHS viscosity is measured at very high shear rates and high temperatures ($10^6$ s$^{-1}$ and 150° C., respectively). The high molecular weight polymer chains are quite flexible when dissolved in oil. With increasing shear rate, the polymer chains are progressively deformed and oriented by the viscous grip of the oil. As the coil stretched, its contribution to the viscosity of oil is reduced.

Characteristics of the OCP that mainly affect performance aspects, including TE and SSI, are the ratio of ethylene to propylene, the molecular weight of the polymer, and the molecular weight distribution of the polymer. The ethylene-propylene ratio of the VM can also impact low temperature properties of the lubricant, including cold cranking simulator (CCS, ASTM D5293) and pour point (ASTM D97) performance.

One proposed improvement in low temperature performance of OCPs is the use of blends of amorphous and semi-crystalline ethylene-based copolymers for lubricant oil formulations. For example, a combination of two ethylene-propylene copolymers allows for increased thickening efficiency while maintaining low temperature viscometric performance. See, e.g., U.S. Pat. Nos. 7,402,235 and 5,391,617, and European Patent 0 638,611.

There remains a need for OCP compositions suitable for use as VI improvers that provide improved lubricant flow properties over a wide range of temperatures and shear conditions. As lubricating oil performance standards have become more stringent, there has been a continued demand for lubricating oil compositions providing improved fuel economy. Fuel economy improvement has been related to the engine oil viscosity. Lower viscosity oils can reduce frictional losses in an operating engine under various conditions. Selecting a viscosity index modifier with a chemistry and architecture that can deliver good shear stability and a high contribution to lubricant oil kinematic viscosity while improving fuel efficiency is desirable. There remains a need for highly-branched ethylene copolymer-based viscosity modifiers capable of shear thinning behavior. Furthermore, there remains a need to improve low temperature performance of polymers in oils and fuels.

SUMMARY

The present disclosure relates to lubricant oil compositions comprising a long chain branched copolymer and methods for making such compositions. Lubricant compositions of the present disclosure comprise an oil and a long chain branched copolymer having a shear stability index (30 cycles) of from about 2% to about 80%; and a kinematic viscosity at 100° C. of from about 3 cSt to about 30 cSt, and wherein the long chain branched copolymer has:

a Mw(LS)/Mn(DRI) from about 1.5 to about 6;
a Mw(LS) from about 20,000 to about 600,000 g/mol;
a g'$_{vis}$ of from about 0.7 to about 0.98;
an ethylene content of about 20 wt % to about 90 wt %;
and wherein the copolymer comprises a remnant of a metal hydrocarbenyl chain transfer agent wherein the metal hydrocarbenyl chain transfer agent is represented by formula:

$$Al(R')_{3-v}(R'')_v$$

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

Also disclosed is a method of making a lubricant composition comprising blending an oil with a long chain branched copolymer, the composition having a shear stability index (30 cycles) of from about 2% to about 80%, and a kinematic viscosity at 100° C. of from about 3 cSt to about 30 cSt, and wherein the copolymer has:
- a Mw(LS)/Mn(DRI) from about 1.5 to about 6;
- a Mw(LS) from about 20,000 to about 600,000 g/mol;
- a g'vis of from about 0.7 to about 0.98;
- an ethylene content of about 20 wt % to about 90 wt %, and wherein the copolymer comprises a remnant of a metal hydrocarbenyl chain transfer agent wherein the metal hydrocarbenyl chain transfer agent is represented by formula:

$$Al(R')_{3-v}(R'')_v$$

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

In another class of embodiments, the present disclosure provides a lubricant composition comprising first and second copolymers wherein the first copolymer has an ethylene content higher than that of the second copolymer.

In yet another aspect, the present disclosure is concerned with a concentrate comprising: a diluent oil; and about 0.5 wt. % to 20 wt. % of a viscosity index improver comprising: a long chain branched copolymer having a Mw(LS)/Mn(DRI) from about 1.5 to about 6; a Mw(LS) from about 20,000 to about 600,000 g/mol; a g'$_{vis}$ of from about 0.7 to about 0.98; and an ethylene content of about 20 wt % to about 90 wt %; and wherein the copolymer comprises a remnant of a metal hydrocarbenyl chain transfer agent wherein the metal hydrocarbenyl chain transfer agent is represented by formula: $Al(R')_{3-v}(R'')_v$ wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

BRIEF DESCRIPTION OF THE FIGURES

FIG. 1 is a plot of shear stability index versus high temperature, high shear (HTHS) viscosity for lubricant oils comprising viscosity modifiers according to one embodiment of the present disclosure.

FIG. 2. Dynamic frequency sweep on neat polymers at 190° C. for commercial linear OCP vs. inventive branch-on-branch EP, respectively.

FIG. 3. Plot of polymer Mw (LS) vs. the shear thinning ratio where the shear thinning ratio is defined as the complex viscosity at a frequency of 0.1 rad/s divided by the complex viscosity at a frequency of 100 rad/s.

FIG. 4. Plot of ethylene (wt %) from FTIR vs. the Heat of Fusion (J/g) of the copolymer melting peak as measured by DSC.

DETAILED DESCRIPTION

The present disclosure relates to lubricant compositions comprising a long chain branched copolymer and methods for making such compositions. Lubricant compositions of the present disclosure comprise an oil and a long chain branched copolymer having a shear stability index (30 cycles) of from about 2% to about 80%; and a kinematic viscosity at 100° C. of from about 3 cSt to about 30 cSt, and wherein the long chain branched copolymer has:
- a Mw(LS)/Mn(DRI) from about 1.5 to about 6;
- a Mw(LS) from about 20,000 to about 600,000 g/mol;
- a g'$_{vis}$ of from about 0.7 to about 0.98;
- an ethylene content of about 20 wt % to about 90 wt %;
- and wherein the copolymer comprises a remnant of a metal hydrocarbenyl chain transfer agent wherein the metal hydrocarbenyl chain transfer agent is represented by formula:

$$Al(R')_{3-v}(R'')_v$$

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

Also disclosed is a method of making a lubricant composition comprising blending an oil with a long chain branched copolymer, the composition having a shear stability index (30 cycles) of from about 2% to about 80%, and a kinematic viscosity at 100° C. of from about 3 cSt to about 30 cSt, and wherein the copolymer has:
- a Mw(LS)/Mn(DRI) from about 1.5 to about 6;
- a Mw(LS) from about 20,000 to about 600,000 g/mol;
- a g'vis of from about 0.7 to about 0.98;
- an ethylene content of about 20 wt % to about 90 wt %,
- and wherein the copolymer comprises a remnant of a metal hydrocarbenyl chain transfer agent wherein the metal hydrocarbenyl chain transfer agent is represented by formula:

$$Al(R')_{3-v}(R'')_v$$

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

The long chain branched copolymers can be synthesized from quinolinyldiamido (QDA) or pyridyldiamido (PDA) catalysts and an added aluminum vinyl transfer agent (AVTA), and used as viscosity modifiers in oil. In at least one embodiment, copolymers, such as ethylene-propylene copolymers, produced by the methods disclosed herein have Mw(LS) greater than about 20 kg/mol, more typically from about 40 Kg/mol to about 600 Kg/mol, and even more typically from about 40 Kg/mol to about 550 Kg/mol. In at least one embodiment, the copolymer has an ethylene content of about 20 wt % to about 90 wt %, more typically less than about 85 wt %, even more typically less than about 65 wt %, or less than about 55 wt %, or even less than about 45 wt %. In at least one embodiment, the branched copolymers have a Mw(LS)/Mn(DRI) value in the range of 1.5 to 6, more typically from 2.0 to 5.0, and even more typically from 3 to 4.5. Lubricant compositions of the present disclosure have a kinematic viscosity at 100° C. of from about 3 cSt to about 30 cSt and include branched copolymers with a shear stability index (30 cycles) of from about 2% to about 80%.

Ethylene-based copolymers of the present disclosure can be used as viscosity modifiers and provide enhanced thickening efficiency to shear stability index (TE/SSI) balance. These copolymers can be made via Coordinated Chain Transfer Polymerization (CCTP) using a suitable polymerization catalyst and an added aluminum vinyl transfer agent (AVTA), such as disclosed in US Patent Application Publications US 2018/020698 and US 20158/013481.

In another class of embodiments, the present disclosure provides a lubricant composition comprising first and second copolymers wherein the first copolymer has an ethylene content higher than that of the second copolymer, and wherein at least one of the two copolymers is a long chain branched ethylene copolymer.

In yet another aspect, the present disclosure is concerned with a concentrate comprising: a diluent oil; and about 0.5 wt. % to 20 wt. % of a long chain branched copolymer having a Mw(LS)/Mn(DRI) from about 1.5 to about 6; a Mw(LS) from about 20,000 to about 600,000 g/mol; a $g'_{vis}$ of from about 0.7 to about 0.98; and an ethylene content of about 20 wt % to about 90 wt %; and wherein the copolymer comprises a remnant of a metal hydrocarbenyl chain transfer agent wherein the metal hydrocarbenyl chain transfer agent is represented by formula: $Al(R')_{3-v}(R'')_v$ wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

For purposes herein, the numbering scheme for the Periodic Table Groups is used as described in CHEMICAL AND ENGINEERING NEWS, 63(5), pg. 27 (1985). For example, a "Group 4 metal" is an element from Group 4 of the Periodic Table, e.g., Hf, Ti, or Zr.

As used herein, an "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 55 wt % to 65 wt %, it is understood that the monomer ("mer") unit in the copolymer is derived from ethylene in the polymerization reaction and said derived units are present at 55 wt % to 65 wt %, based upon the weight of the copolymer.

A "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers.

For purposes of this disclosure, ethylene shall be considered an α-olefin.

The "melt flow rate" (MFR) is measured in accordance with ASTM D1238 at 230° C. and 2.16 kg load. The high load melt flow rate (MFR HL) is measured in accordance with ASTM D1238 at 230° C. and 21.6 kg load.

As used herein, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Copolymers (and terpolymers) of polyolefins have one or more comonomers, such as propylene, incorporated into the polyethylene backbone. These copolymers (and terpolymers) provide varying physical properties compared to polyethylene alone and are produced in a low pressure reactor, utilizing, for example, solution, slurry, or gas phase polymerization processes. The comonomer content of a polyolefin (e.g., wt % of comonomer incorporated into a polyolefin backbone) influences the properties of the polyolefin (and composition of the copolymers) and is dependent on the identity of the polymerization catalyst.

"Linear" means that the polymer has few, if any, long chain branches and has a g'vis value of about 0.97 or above, such as about 0.98 or above.

The term "cyclopentadienyl" refers to a 5-member ring having delocalized bonding within the ring and being bound to M through $\eta^5$-bonds, carbon making up the majority of the 5-member positions.

As used herein, a "catalyst" includes a single catalyst, or multiple catalysts with each catalyst being conformational isomers or configurational isomers. Conformational isomers include, for example, conformers and rotamers. Configurational isomers include, for example, stereoisomers.

The term "complex," may also be referred to as catalyst precursor, precatalyst, catalyst, catalyst compound, transition metal compound, or transition metal complex. These words are used interchangeably. Activator and cocatalyst are also used interchangeably.

Unless otherwise indicated, the term "substituted" generally means that a hydrogen of the substituted species has been replaced with a different atom or group of atoms. For example, methyl-cyclopentadiene is cyclopentadiene that has been substituted with a methyl group. Likewise, picric acid can be described as phenol that has been substituted with three nitro groups, or, alternatively, as benzene that has been substituted with one hydroxy and three nitro groups.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., $CH_2Ph$), THE (also referred to as thf) is tetrahydrofuran, RT is room temperature (and is 23° C. unless otherwise indicated), tol is toluene, EtOAc is ethyl acetate, Cy is cyclohexyl, AVTA is an aluminum-based vinyl transfer agent, LS is Light Scattering, MALLS is Multi Angle Light Scattering, DRI is Differential Refractive Index, IR is Infrared, SPLM is Standard Liters Per Minute, psig is pound-force per square inch, TE is thickening efficiency, SSI is Shear Stability Index, HTHS is High Temperature High Shear, TLTM is too low to measure, THTM is too high to measure.

An "anionic ligand" is a negatively charged ligand that donates one or more pairs of electrons to a metal ion. A "neutral donor ligand" is a neutrally charged ligand which donates one or more pairs of electrons to a metal ion.

As used herein, a "catalyst system" includes at least one catalyst compound and a support material. A catalyst system of the present disclosure can further include an activator and an optional co-activator. For the purposes of this disclosure, when a catalyst is described as comprising neutral stable forms of the components, it is well understood by one of ordinary skill in the art, that the ionic form of the component is the form that reacts with the monomers to produce polymers. Furthermore, catalysts of the present disclosure represented by a Formula are intended to embrace ionic forms thereof of the compounds in addition to the neutral stable forms of the compounds. Furthermore, activators of the present disclosure are intended to embrace ionic/reaction product forms thereof of the activator in addition to ionic or neutral form.

A scavenger is a compound that can be added to a reactor to facilitate polymerization by scavenging impurities. Some scavengers may also act as chain transfer agents. Some scavengers may also act as activators and may be referred to as co-activators. A co-activator, that is not a scavenger, may also be used in conjunction with an activator in order to form an active catalyst. In at least one embodiment, a co-activator can be pre-mixed with the transition metal compound to form an alkylated transition metal compound. Examples of scavengers include trialkylaluminums, methylalumoxanes, modified methylalumoxanes, MMAO-3A (Akzo Nobel), bis (diisobutylaluminum)oxide (Akzo Nobel), tri(n-octyl)aluminum, triisobutylaluminum, and diisobutylaluminum hydride.

As used herein, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may include at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and their substituted analogues. Substituted hydrocarbyl radicals are radicals in which at least one hydrogen atom of the hydrocarbyl radical has been substituted with at least one halogen (such as Br, Cl, F or I) or at least one functional group such as $C(O)R^*$, $C(O)NR^*_2$, $C(O)OR^*$, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, and $PbR^*_3$ (where $R^*$ is independently a hydrogen or hydrocarbyl radical, and two or more $R^*$ may join together to form a substituted or unsubstituted saturated, partially unsaturated or aromatic cyclic or polycyclic ring structure), or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include ethenyl, propenyl, allyl, 1,4-butadienyl cyclopropenyl, cyclobutenyl, cyclopentenyl, cyclohexenyl, cyclooctenyl, including their substituted analogues.

The term "alkoxy" or "alkoxide" means an alkyl ether or aryl ether radical wherein the term alkyl is as defined above. Examples of suitable alkyl ether radicals include methoxy, ethoxy, n-propoxy, iso-propoxy, n-butoxy, iso-butoxy, sec-butoxy, tert-butoxy, and phenoxyl.

The term "aryl" or "aryl group" includes a $C_4$-$C_{20}$ aromatic ring, such as a six carbon aromatic ring, and the substituted variants thereof, including phenyl, 2-methyl-phenyl, xylyl, 4-bromo-xylyl. Likewise heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, iso-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

A "composition" of the present disclosure can include components (e.g., oil, polymer, etc.) and/or reaction product (s) of two or more of the components.

The terms oil composition, lubricating oil composition, lubrication oil composition, and lubricant composition are used interchangeably, and refer to a composition comprising an ethylene based copolymer including ethylene propylene copolymers, and an oil.

The term "continuous" means a system that operates without interruption or cessation. For example a continuous process to produce a polymer would be one where the reactants are continually introduced into one or more reactors and polymer product is continually withdrawn during a polymerization process.

A solution polymerization means a polymerization process in which the polymer is dissolved in a liquid polymerization medium, such as an inert solvent or monomer(s) or their blends. A solution polymerization can be homogeneous. A homogeneous polymerization is one where the polymer product is dissolved in the polymerization medium. Such systems are not turbid as described in J. Vladimir Oliveira, C. Dariva and J. C. Pinto, Ind. Eng. Chem. Res., 2000, Vol. 29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as about 0 wt %.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat-1h-1. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole (or mmol) of catalyst (cat) used (kgP/molcat or gP/mmolCat), and catalyst activity can also be expressed per unit of time, for example, per hour (hr). "Catalyst efficiency" is a measure of how efficient the catalyst is and is reported as the mass of product polymer (P) produced per mass of catalyst (cat) used (gP/gcat). The mass of the catalyst is the weight of the pre-catalyst without including the weight of the activator.

The term "quinolinyldiamido complex" or "quinolinyldiamide complex" or "quinolinyldiamido catalyst" or "quinolinyldiamide catalyst" refers to a class of coordination complexes described in U.S. Pub. No. 2018/0002352 A1. The term "pyridyldiamido complex" or "pyridyldiamide complex" refers to a class of coordination complexes described in U.S. Pat. Nos. 9,315,593 and 7,973,116. Both quinolinyldiamido and pyridyldiamido complexes feature a dianionic tridentate ligand that is coordinated to a metal center through one neutral Lewis basic donor atom (e.g., a pyridine group, a quinoline group) and a pair of anionic amido or phosphido (i.e., deprotonated amine or phosphine) donors. In these complexes the quinolinyldiamido ligand or the pyridyldiamido ligand is coordinated to the metal with the formation of one five membered chelate ring and one seven membered chelate ring. It is possible for additional atoms of the quinolinyldiamido or pyridyldiamido ligand to be coordinated to the metal without affecting the catalyst function upon activation; an example of this could be a cyclometalated substituted aryl group that forms an additional bond to the metal center.

Herein, "catalyst" and "catalyst complex" are used interchangeably.

The present disclosure relates to ethylene copolymers, more specifically to ethylene propylene (EP) copolymers, useful for viscosity modification applications in lubricants.

The ethylene copolymers employed according to the present disclosure can be prepared by a method comprising contacting ethylene and one or more $C_3$ to $C_{20}$ alpha-olefins with a catalyst system comprising an activator, a chain transfer agent, and a pyridyldiamido transition metal complex represented by the formula (I) (shown below); to obtain a copolymer having an ethylene content of about 20 wt % to about 90 wt %. The copolymer can include an ethylene content of about 20 wt % to about 90 wt %. Alternatively, the copolymer can consist essentially of an ethylene content of about 30 wt % to about 80 wt %. Alternatively, the copolymer can consist of an ethylene content of about 40 wt % to about 75 wt %.

The catalyst systems that can be employed include a metal hydrocarbenyl transfer agent, represented by the formula: $Al(R')_{3-v}(R'')_v$, wherein each R', independently, is a $C_1$ to $C_{30}$ hydrocarbyl group; each R'', independently, is a $C_4$ to $C_{20}$ hydrocarbenyl group having an vinyl chain end; v is from 0.1 to 3 (such as 1 or 2). In at least one embodiment, the metal hydrocarbenyl transfer agent is an aluminum vinyl-transfer agent (AVTA) represented by the formula: $Al(R')_{3-v}(R)_v$ with R defined as a hydrocarbenyl group containing 4 to 20 carbon atoms and featuring an vinyl chain end, R' defined as a hydrocarbyl group containing 1 to 30 carbon atoms, and v defined as 0.1 to 3 (such as 1 or 2).

In another embodiment, the copolymer comprises a remnant of a metal hydrocarbenyl chain transfer agent wherein the metal hydrocarbenyl chain transfer agent is represented by formula: $Al(R')_{3-v}(R'')_v$ wherein each R', independently, is a $C_4$-$C_{10}$ hydrocarbyl group; each R'', independently, is a $C_8$-$C_{10}$ hydrocarbenyl group having an end-vinyl group; and v is from 0.1 to 3.

In another embodiment, the copolymer comprises a remnant of a metal hydrocarbenyl chain transfer agent wherein the metal hydrocarbenyl chain transfer agent is represented by formula: $Al(R')_{3-v}(R'')_v$ wherein each R', independently, is a $C_4$ hydrocarbyl group; each R'', independently, is a $C_{10}$ hydrocarbenyl group having an end-vinyl group; and v is from 1 to 3.

In still further embodiment, the copolymer comprises a remnant of metal hydrocarbenyl chain transfer agent wherein the metal hydrocarbenyl chain transfer agent is represented by formula: $Al(R')_{3-v}(R'')_v$ wherein each R', independently, is a $C_4$ hydrocarbyl group; each R'', independently, is a $C_8$ hydrocarbenyl group having an end-vinyl group; and v is from 1 to 3.

The catalyst/activator combinations are formed by combining the transition metal complex with activators in any suitable manner, including by supporting them for use in slurry or gas phase polymerization. The catalyst/activator combinations may also be added to or generated in solution polymerization or bulk polymerization (in the monomer). The metal hydrocarbenyl transfer agent (such as an aluminum vinyl transfer agent) may be added to the catalyst and or activator before, during or after the activation of the catalyst complex or before or during polymerization. In at least one embodiment, the metal hydrocarbenyl transfer agent (such as the aluminum vinyl-transfer agent) is added to the polymerization reaction separately, such as before, the catalyst/activator pair.

Alkene polymerizations and co-polymerizations using one or more transfer agents, such as an AVTA, with two or more catalysts are also of potential use. Products that may be accessed with this approach can include polymers that have branch block structures and/or high levels of long-chain branching.

The transfer agent to catalyst complex equivalence ratio can be from 1:100 to 500,000:1. In at least one embodiment, the molar ratio of transfer agent to catalyst complex is greater than one. Alternately, the molar ratio of transfer agent to catalyst complex is greater than 30. The AVTA to catalyst complex equivalence ratio can be from 1:100 to 500,000:1. In at least one embodiment, the molar ratio of AVTA to catalyst complex is greater than one. In at least one embodiment, the molar ratio of AVTA to catalyst complex is greater than 30.

The AVTA can also be used in combination with other suitable chain transfer agents that can be used as scavengers, such as trialkyl aluminum compounds (where the alkyl groups are selected from $C_1$ to $C_{20}$ alkyl groups, such as methyl, ethyl, propyl, butyl, pentyl, hexyl, heptyl, octyl, nonyl, decyl, undecyl, dodecyl, or an isomer thereof). The ATVA can be used in combination with a trialkyl aluminum compound such as tri-n-octylaluminum and triisobutylaluminum.

The transfer agent can also be used in combination with oxygen-containing organoaluminums such as bis(diisobutylaluminum)oxide, MMAO-3A, and other alumoxanes. Certain of these oxygen-containing organoaluminums can serve as scavengers while remaining significantly less prone to hydrocarbyl group chain-transfer than organoaluminums, such as trimethylaluminum or tri(n-octyl)aluminum.

The production of di-end-functionalized polymers is possible with this technology. One product, prior to exposure to air, from an alkene polymerization performed in the presence of AVTA is the aluminum-capped species $Al(R')_{3-v}$(polymer-$CH=CH_2)_v$, where v is 0.1 to 3 (alternately 1 to 3, alternately 1, 2, or 3). The Al-carbon bonds will react with a variety of electrophiles (and other reagents), such as oxygen, halogens, carbon dioxide, and the like. Thus, quenching the reactive polymer mixture with an electrophile prior to exposure to atmosphere would yield a di-end-functionalized product of the general formula: Z-(monomers)$_n$-$CH=CH_2$, where Z is a group from the reaction with the electrophile and n is an integer, such as from 1 to 1,000,000, alternately from 2 to 50,000, alternately from 10 to 25,000. For example, quenching with oxygen yields a polymer functionalized at one end with a hydroxy group and at the other end with a vinyl group. Quenching with bromine yields a polymer functionalized at one end with a Br group and at the other end with a vinyl group.

Suitable metal hydrocarbenyl transfer agents (such as the aluminum vinyl transfer agents) can be present at from 10 or 20 or 50 or 100 equivalents to 600 or 700 or 800 or 1000 equivalents relative to the catalyst complex. Alternately, the metal hydrocarbenyl transfer agents can be present at a catalyst complex-to-transfer agent molar ratio of from 1:3000 to 10:1; alternatively 1:2000 to 10:1; alternatively 1:1000 to 10:1; alternatively 1:500 to 1:1; alternatively 1:300 to 1:1; alternatively 1:200 to 1:1; alternatively 1:100 to 1:1; alternatively 1:50 to 1:1; alternatively 1:10 to 1:1.

In at least one embodiment of the present disclosure, the aluminum vinyl transfer agent is present at a catalyst complex-to-aluminum vinyl transfer agent molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1, alternately from 1:1000 or more.

Transition Metal Complexes

Transition metal complexes for polymerization processes can include any olefin polymerization catalyst that readily undergoes reversible polymeryl group chain transfer with the added aluminum vinyl transfer agent (AVTA) and is also capable of incorporating the vinyl group of the AVTA to form a long-chain branched polymer. Suitable catalyst components may include "non-metallocene complexes" that are defined to be transition metal complexes that do not feature a cyclopentadienyl anion or substituted cyclopentadienyl anion donors (e.g., cyclopentadienyl, fluorenyl, indenyl, methylcyclopentadienyl). Examples of families of non-metallocene complexes that may be suitable can include late transition metal pyridylbisimines (e.g., U.S. Pat. No. 7,087,686), group 4 pyridyldiamidos (e.g., U.S. Pat. No. 7,973,116), quinolinyldiamidos (e.g., U.S. Pub. No. 2018/0002352 A1), pyridylamidos (e.g., U.S. Pat. No. 7,087,690), phenoxyimines (e.g., Accounts of Chemical Research 2009, 42, 1532-1544), and bridged bi-aromatic complexes (e.g., U.S. Pat. No. 7,091,292), the disclosures of which are incorporated herein by reference.

Non-metallocene complexes can include iron complexes of tridentate pyridylbisimine ligands, zirconium and hafnium complexes of pyridylamido ligands, zirconium and hafnium complexes of tridentate pyridyldiamido ligands, zirconium and hafnium complexes of tridentate quinolinyldiamido ligands, zirconium and hafnium complexes of bidentate phenoxyimine ligands, and zirconium and hafnium complexes of bridged bi-aromatic ligands.

Suitable non-metallocene complexes can include zirconium and hafnium non-metallocene complexes. In at least one embodiment, non-metallocene complexes for the present disclosure include group 4 non-metallocene complexes including two anionic donor atoms and one or two neutral donor atoms. Suitable non-metallocene complexes for the present disclosure include group 4 non-metallocene complexes including an anionic amido donor. Suitable non-metallocene complexes for the present disclosure include group 4 non-metallocene complexes including an anionic aryloxide donor atom. Suitable non-metallocene complexes for the present disclosure include group 4 non-metallocene complexes including two anionic aryloxide donor atoms and two additional neutral donor atoms.

In at least one embodiment, an ethylene copolymer employed according to the present disclosure is formed by contacting ethylene and one or more $C_3$ to $C_{20}$ alpha-olefins with a catalyst system comprising an activator, a chain transfer agent (which may be a material that can function as both a scavenger and a metal hydrocarbenyl chain transfer agent (such as an aluminum vinyl-transfer agent, such as isobutyldi(dec-9-en-1-yl)aluminum (AVTA-2/10)) and a transition metal complex represented by formula (I):

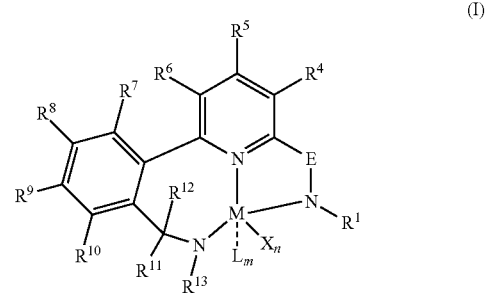

wherein:

M is a Group 3, 4, 5, 6, 7, 8, 9, or 10 metal; (such as M is Zr or Hf);

E is chosen from $C(R^2)$ or $C(R^3)(R^{3'})$;

X is an anionic leaving group;

L is a neutral Lewis base, or two L groups may be joined to form a bidentate Lewis base; (such as L is ether, amine, phosphine, or thioether);

$R^1$ and $R^{13}$ are independently selected from hydrocarbyl, substituted hydrocarbyl, and silyl;

$R^2$ is a group containing 1-10 carbon atoms that is optionally joined with $R^4$ to form an aromatic ring;

$R^3$, $R^{3'}$, $R^4$, $R^5$, $R^6$, $R^7$, $R^8$, $R^9$, $R^{10}$, $R^{11}$, and $R^{12}$ are each independently selected from hydrogen, hydrocarbyl, alkoxy, silyl, amino, aryloxy, substituted hydrocarbyl, halogen, and phosphino;

J is a divalent group that forms a three-atom-length bridge between the pyridine ring and the amido nitrogen;

n is 1 or 2;

m is 0, 1, or 2;

two X groups may be joined together to form a dianionic group;

two L groups may be joined together to form a bidentate Lewis base;

an X group may be joined to an L group to form a monoanionic bidentate group;

adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring.

An exemplary catalyst is $(QDA-1)HfMe_2$, as described in U.S. Pub. No. 2018/0002352 A1.

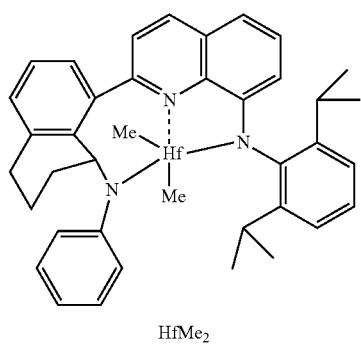

(QDA-1)

HfMe$_2$

Chain Transfer Agents (CTAs)

A "chain transfer agent" is any agent capable of hydrocarbyl and/or polymeryl group exchange between a coordinative polymerization catalyst and the metal center of the chain transfer agent during a polymerization process. The chain transfer agent can be any desirable chemical compound such as those disclosed in WO 2007/130306. For example, the chain transfer agent can be a Group 2, 12, or 13 alkyl or aryl compound; such as zinc, magnesium or aluminum alkyls or aryls; such as where the alkyl is a $C_1$ to $C_{30}$ alkyl, alternately a $C_2$ to $C_{20}$ alkyl, alternately a $C_3$ to $C_{12}$ alkyl, independently methyl, ethyl, propyl, butyl, isobutyl, tert-butyl, pentyl, hexyl, cyclohexyl, phenyl, octyl, nonyl, decyl, undecyl, dodecyl, or isomers and analogs thereof.

Suitable chain transfer agents can be alkylalumoxanes, a compound represented by the formula $AlR_3$, $ZnR_2$ (where each R is, independently, a $C_1$ to $C_8$ aliphatic radical, such as methyl, ethyl, propyl, butyl, pentyl, hexyl octyl or an isomer thereof), or a combination thereof, such as diethyl zinc, methylalumoxane, trimethylaluminum, triisobutylaluminum, trioctylaluminum, or a combination thereof.

Suitable agents that can be used are trialkyl aluminum compounds and dialkyl zinc compounds having from 1 to 8 carbons in each alkyl group, such as triethylaluminum (TEAL), tri(i-propyl) aluminum, tri(i-butyl) aluminum (TIBAL), tri(n-hexyl)aluminum, tri(n-octyl)aluminum (TNOAL), diethyl zinc, diisobutyl zinc, di(n-propyl)zinc, dioctyl zinc. Mixtures of chain transfer agents may also be used. Suitable agents are diethyl zinc and tri(n-octyl) aluminum.

In at least one embodiment, one or more trialkyl aluminum compounds and one or more dialkyl zinc compounds (where the alkyl can be a $C_1$ to $C_{40}$ alkyl group, such as a $C_2$ to $C_{20}$ alkyl group, such as a $C_2$ to $C_{12}$ alkyl group, such as a $C_2$ to $C_8$ group, such as methyl, ethyl, propyl (including isopropyl and n-propyl), butyl (including n-butyl, sec-butyl and iso-butyl) pentyl, hexyl, heptyl, octyl, and isomers or analogs thereof are used as the CTA. Suitable combinations include TEAL, TIBAL, and/or TNOAL with $Et_2Zn$, such as TEAL and $Et_2Zn$, or TIBAL and $Et_2Zn$, or TNOAL and $Et_2Zn$. In at least one embodiment, the trialkyl aluminum and dialkyl zinc compounds are present in the reaction at a molar ratio of Al to Zn of 1:1 or more, such as 2:1 or more, such as 5:1 or more, such as 10:1 or more, such as 15:1 or more, such as from 1:1 to 10,000:1.

Additional suitable chain transfer agents include the reaction product or mixture formed by combining the trialkylaluminum or dialkylzinc compound, such as a tri($C_1$ to $C_8$)alkylaluminum or di($C_1$ to $C_8$)alkylzinc compound, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl) amine, 2,6-di(t-butyl)phenol, ethyl(1-naphthyl)amine, bis(2, 3,6,7-dibenzo-1-azacycloheptaneamine), or 2,6-diphenylphenol. In at least one embodiment, sufficient amine or hydroxyl reagent can be used such that one hydrocarbyl group remains per metal atom. The primary reaction products of the foregoing combinations useful in the present disclosure as chain transfer agents include n-octylaluminum di(bis(trimethylsilyl)amide), i-propylaluminumbis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc(2,6-diphenylphenoxide), and ethylzinc(t-butoxide).

Suitable chain transfer agent(s) can be present in the reaction at a molar ratio of metal of the chain transfer agent to transition metal (from the quinolinyldiamido transition metal complex) of about 5:1 or more, such as from about 10:1 to 2000:1, such as from about 20:1 to about 1000:1, such as from about 25:1 to about 800:1, such as from about 50:1 to about 700:1, such as from about 100:1 to about 600:1.

In at least one embodiment, the CTA is di-alkyl zinc, where the alkyl is a $C_1$ to $C_{20}$ alkyl group, such as methyl, ethyl, propyl, butyl, such as the CTA is diethylzinc. A chain transfer agent of the present disclosure can be a metal hydrocarbenyl transfer agent (which is any group 12 or 13 metal agent that contains at least one transferrable group that has an allyl chain end), such as an aluminum vinyl-transfer agent, also referred to as an AVTA, (which is any aluminum agent that contains at least one transferrable group that has an allyl chain end). An allyl chain end is represented by the formula $H_2C=CH-CH_2-$. "Allylic vinyl group," "allyl chain end," "vinyl chain end," "vinyl termination," "allylic vinyl group," "terminal vinyl group," and "vinyl terminated" are used interchangeably herein and refer to an allyl chain end. An allyl chain end is not a vinylidene chain end or a vinylene chain end. The number of allyl chain ends, vinylidene chain ends, vinylene chain ends, and other unsaturated chain ends is determined using $^1H$ NMR at 120° C. using deuterated tetrachloroethane as the solvent on an at least 250 MHz NMR spectrometer.

Suitable transferable groups containing an allyl chain end are represented by the formula $CH_2=CH-CH_2-R^*$, where $R^*$ represents a hydrocarbyl group or a substituted hydrocarbyl group, such as a $C_1$ to $C_{20}$ alkyl, such as methyl, ethyl, propyl, butyl, pentyl, hexyl, heptyl, octyl, nonyl, decyl, undecyl, dodecyl, or an isomer thereof.

In the catalyst system described herein, the catalyst undergoes alkyl group transfer with the transfer agent, which enables the formation of polymer chains containing one or more allyl chain ends.

Exemplary transferable groups containing an allyl chain end can also include those represented by the formula $CH_2=CH-CH_2-R^{}$, where $R^{}$ represents a hydrocarbeneyl group or a substituted hydrocarbenyl group, such as a $C_1$ to $C_{20}$ alkylene, such as methylene ($CH_2$), ethylene $[(CH_2)_2]$, propandiyl $[(CH_2)_3]$, butandiyl $[(CH_2)_4]$, pentandiyl $[(CH_2)_5]$, hexandiyl $[(CH_2)_6]$, heptandiyl $[(CH_2)_7]$, octandiyl $[(CH_2)_8]$, nonandiyl $[(CH_2)_9]$, decandiyl $[(CH_2)_{10}]$, undecandiyl $[(CH_{20})_{11}]$, dodecandiyl $[(CH_2)_{12}]$, or an isomer thereof. Suitable transferable groups can be non-substituted linear hydrocarbeneyl groups. In at least one embodiment, at least one $R^{**}$ is a $C_4-C_{20}$ hydrocarbenyl group.

The term "hydrocarbeneyl" refers to a hydrocarb-di-yl divalent group, such as a $C_1$ to $C_{20}$ alkylene (i.e., methylene ($CH_2$), ethylene $[(CH_2)_2]$, propandiyl $[(CH_2)_3]$, butandiyl $[(CH_2)_4]$, pentandiyl $[(CH_2)_5]$, hexandiyl $[(CH_2)_6]$, heptandiyl $[(CH_2)_7]$, octandiyl $[(CH_2)_8]$, nonandiyl $[(CH_2)_9]$, decandiyl $[(CH_2)_{10}]$, undecandiyl $[(CH_{20})_{11}]$, dodecandiyl $[(CH_2)_{12}]$, or an isomer thereof).

Without being bound by theory, AVTAs are alkenylaluminum reagents capable of causing group exchange between the transition metal of the catalyst system ($M^{TM}$) and the metal of the AVTA ($M^{AVTA}$). The reverse reaction may also occur such that the polymeryl chain is transferred back to the transition metal of the catalyst system. This reaction scheme is illustrated below:

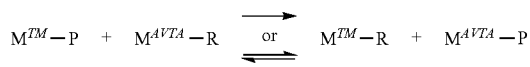

wherein $M^{TM}$ is an active transition metal catalyst site and P is the polymeryl chain, $M^{AVTA}$ is the metal of the AVTA, and R is a transferable group containing an allyl chain end, such as a hydrocarbyl group containing an allyl chain end, also called a hydrocarbenyl or alkenyl group.

In at least one embodiment, catalyst systems that can be used have high rates of olefin propagation and negligible or no chain termination via beta hydride elimination, beta methyl elimination, or chain transfer to monomer relative to the rate of chain transfer to the AVTA or other chain transfer agent, such as an aluminum alkyl, if present. Quinolinyl-diamido catalyst complexes (see U.S. Ser. No. 62/357,033, filed Jun. 30, 2016) and/or other catalyst compounds (U.S. Pat. Nos. 7,973,116; 8,394,902; 8,674,040; 8,710,163; 9,102,773; US 2014/0256893; US 2014/0316089; and US 2015/0141601) activated with non-coordinating activators such as dimethylanilinium tetrakis(perfluorophenyl)borate and/or dimethylanilinium tetrakis(perfluoronaphthyl)borate are particularly useful in the catalyst systems that can be used.

In at least one embodiment, the catalyst system includes an aluminum vinyl transfer agent, which is represented by the formula (A):

$$Al(R')_{3-v}(R)_v$$

where R is a hydrocarbenyl group containing 4 to 20 carbon atoms having an allyl chain end, R' is a hydrocarbyl group containing 1 to 30 carbon atoms, and v is 0.1 to 3, alternately 1 to 3, alternately 1.1 to less than 3, alternately v is 0.5 to 2.9, 1.1 to 2.9, alternately 1.5 to 2.7, alternately 1.5 to 2.5, alternately 1.8 to 2.2. The compounds represented by the formula $Al(R')_{3-v}(R)_v$ are a neutral species, but anionic formulations may be included, such as those represented by formula (B): $[Al(R')_{4-w}(R)_w]^-$, where w is 0.1 to 4, R is a hydrocarbenyl group containing 4 to 20 carbon atoms having an allyl chain end, and R' is a hydrocarbyl group containing 1 to 30 carbon atoms.

In at least one embodiment of a formula for a metal hydrocarbenyl transfer agent, such as formula A or B, described herein, each R' is independently chosen from $C_1$ to $C_{30}$ hydrocarbyl groups (such as a $C_1$ to $C_{20}$ alkyl groups, such as methyl, ethyl, propyl, butyl, pentyl, hexyl, heptyl, octyl, nonyl, decyl, undecyl, dodecyl, or an isomer thereof), and R is represented by the formula:

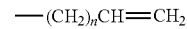

where n is an integer from 2 to 18, such as 6 to 18, such as 6 to 12, such as 6 to 8.

In at least one embodiment, particularly suitable AVTAs include, but are not limited to, tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-9-en-1-yl)aluminum, diisobutyl(dodec-11-en-1-yl)aluminum, and the like. Mixtures of one or more AVTAs may also be used. In at least one embodiment of the present disclosure, suitable AVTAs include isobutyl-di(oct-7-en-1-yl)aluminum, isobutyl-di(dec-9-en-1-yl)aluminum, isobutyl-di(non-8-en-1-yl)aluminum, isobutyl-di(hept-6-en-1-yl)aluminum. In at least one embodiment of the present disclosure, suitable AVTA is isobutyl-di(dec-9-en-1-yl)aluminum.

Particularly suitable metal hydrocarbenyl transfer agents includes one or more of tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, dimethyl(dec-9-en-1-yl)aluminum, diethyl(dec-9-en-1-yl)aluminum, dibutyl(dec-9-en-1-yl)aluminum, diisobutyl(dec-9-en-1-yl)aluminum, and diisobutyl(dodec-11-en-1-yl)aluminum.

Suitable aluminum vinyl transfer agents include organoaluminum compound reaction products between aluminum reagent ($AlR^a_3$) and an alkyl diene. Suitable alkyl dienes include those that have two "alpha olefins", as described above, at two termini of the carbon chain. The alkyl diene can be a straight chain or branched alkyl chain and substituted or unsubstituted. Exemplary alkyl dienes include but are not limited to, for example, 1,3-butadiene, 1,4-pentadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-eicosadiene, 1,20-heneicosadiene, etc. Exemplary aluminum reagents include triisobutylaluminum, diisobutylaluminumhydride, isobutylaluminumdihydride and aluminum hydride ($AlH_3$).

In at least one embodiment of the present disclosure, R" is butenyl, pentenyl, heptenyl, octenyl or decenyl, such as R" is octenyl or decenyl.

In at least one embodiment of the present disclosure, each R' is methyl, ethyl, propyl, isobutyl, or butyl, such as R' is isobutyl.

In at least one embodiment described herein, v is an integer or a non-integer, such as v is from 0.1 to 3.0, alternatively from about 1 to about 3; e.g., from about 1.5 to about 2.7, from about 1.6 to about 2.4, from about 1.7 to about 2.4, from about 1.8 to about 2.2, from about 1.9 to about 2.1 and all ranges there between.

In at least one embodiment of the present disclosure, R' is isobutyl and each R" is octenyl or decenyl, such as R' is isobutyl, each R" is octenyl or decenyl, and v is from 0.1 to 3.0, from about 1 to about 3, alternatively from about 1.5 to about 2.7, e.g., from about 1.6 to about 2.4, from about 1.7 to about 2.4, from about 1.8 to about 2.2, from about 1.9 to about 2.1.

The amount of v (the aluminum alkenyl) is described using the formulas: (3-v)+v=3, and $Al(R')_{3-v}(R'')_v$ where R" is a hydrocarbenyl group containing 4 to 20 carbon atoms having an allyl chain end, R' is a hydrocarbyl group containing 1 to 30 carbon atoms, and v is 0.1 to 3 (such as 1.1 to 3). This formulation represents the observed average of organoaluminum species (as determined by $^1$H NMR) present in a mixture, which may include any of $Al(R')_3$, $Al(R')_2(R'')$, $Al(R')(R'')_2$, and $Al(R'')_3$. $^1$H NMR spectroscopic studies are performed at room temperature using a Bruker 400 MHz NMR. Data is collected using samples prepared by dissolving 10-20 mg the compound in 1 mL of $C_6D_6$. Samples are then loaded into 5 mm NMR tubes for data collection. Data is recorded using a maximum pulse width of 45°, 8 seconds between pulses and signal averaging either 8 or 16 transients. The spectra are normalized to protonated tetrachloroethane in the $C_6D_6$. The chemical shifts (δ) are reported as relative to the residual protium in the deuterated solvent at 7.15 ppm.

In still another aspect, the aluminum vinyl-transfer agent has less than 50 wt % dimer present, based upon the weight of the AVTA, such as less than 40 wt %, such as less than 30 wt %, such as less than 20 wt %, such as less than 15 wt %, such as less than 10 wt %, such as less than 5 wt %, such as less than 2 wt %, such as less than 1 wt %, such as 0 wt % dimer. Alternately dimer is present at from 0.1 to 50 wt %, alternately 1 to 20 wt %, alternately at from 2 to 10 wt %. Dimer is the dimeric product of the alkyl diene used in the preparation of the AVTA. The dimer can be formed under certain reaction conditions, and is formed from the insertion of a molecule of diene into the Al—R bond of the AVTA, followed by beta-hydride elimination. For example, if the alkyl diene used is 1,7-octadiene, the dimer is 7-methylenepentadeca-1,14-diene. Similarly, if the alkyl diene is 1,9-decadiene, the dimer is 9-methylenenonadeca-1,18-diene.

Suitable compounds can be prepared by combining an aluminum reagent (such as alkyl aluminum) having at least one secondary alkyl moiety (such as triisobutylaluminum) and/or at least one hydride, such as a dialkylaluminum hydride, a monoalkylaluminum dihydride or aluminum trihydride (aluminum hydride, $AlH_3$) with an alkyl diene and heating to a temperature that causes release of an alkylene byproduct. The use of solvent(s) is not required. However, non-polar solvents can be employed, such as, as hexane, pentane, toluene, benzene, xylenes, and the like, or combinations thereof.

In at least one embodiment, the AVTA is free of coordinating polar solvents such as tetrahydrofuran and diethylether.

After the reaction is complete, solvent if, present can be removed and the product can be used directly without further purification.

The AVTA to catalyst complex equivalence ratio can be from about 1:100 to 500,000:1. In at least one embodiment, the molar ratio of AVTA to catalyst complex is greater than 5, alternately greater than 10, alternately greater than 15, alternately greater than 20, alternately greater than 25, alternately greater than 30.

In another embodiment of the present disclosure, the metal hydrocarbenyl transfer agent is an alumoxane formed from the hydrolysis of the AVTA. Alternatively, the alumoxane can be formed from the hydrolysis of the AVTA in combination with other aluminum alkyl(s). The alumoxane component is an oligomeric compound which is not well characterized, but can be represented by the general formula $(R—Al—O)_m$ which is a cyclic compound, or may be $R'(R—Al—O)_m—AlR'_2$ which is a linear compound where R' is as defined above and at least one R' is the same as R (as defined above), and m is from about 4 to 25, such as with a range of 13 to 25. In at least one embodiment, all R' are R. An alumoxane is generally a mixture of both the linear and cyclic compounds.

Activators

The terms "cocatalyst" and "activator" are used herein interchangeably and are defined to be a compound which can activate one or more of the catalyst compounds described above by converting the neutral catalyst compound to a catalytically active catalyst compound cation.

After the complexes have been synthesized, catalyst systems may be formed by combining the complexes with activators in any suitable manner including by supporting them for use in slurry or gas phase polymerization. The catalyst systems may also be added to or generated in solution polymerization or bulk polymerization (in the monomer). Suitable catalyst system may include a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Suitable activators may include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In at least one embodiment, alumoxane activators are utilized as an activator in the catalyst system. The alkylalumoxane may be used with another activator. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane, and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. In at least one embodiment, a visually clear methylalumoxane can be used. A cloudy or gelled alumoxane can be filtered to produce a clear solution or clear alumoxane can be decanted from the cloudy solution. Suitable alumoxane can be a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Another suitable alumoxane is solid polymethylaluminoxane as described in U.S. Pat. Nos. 9,340,630; 8,404,880; and 8,975,209.

When the activator is an alumoxane (modified or unmodified), embodiments may include the maximum amount of activator such as at up to about a 5000-fold molar excess Al/M over the catalyst compound (per metal catalytic site). The minimum activator-to-catalyst-compound is about a 1:1 molar ratio. Alternate suitable ranges include from about 1:1 to about 500:1, alternately from about 1:1 to about 200:1, alternately from about 1:1 to about 100:1, or alternately from about 1:1 to about 50:1. In an alternate embodiment, little or no alumoxane is used in the polymerization processes described herein. In at least one embodiment, alumoxane is present at about zero mole %, alternately the alumoxane is present at a molar ratio of aluminum to catalyst compound transition metal less than about 500:1, such as less than about 300:1, such as less than about 100:1, such as less than about 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any suitable metal or metalloid that can form a compatible, weakly coordinating complex may be used or contained in the non-coordinating anion. Suitable metals include aluminum, gold, and platinum. Suitable metalloids include boron, aluminum, phosphorus, and silicon.

"Compatible" non-coordinating anions can be those that are not degraded to neutrality when the initially formed complex decomposes, and the anion does not transfer an anionic substituent or fragment to the cation to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization.

An ionizing activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof can be used. Also neutral or ionic activators alone or in combination with alumoxane or modified alumoxane activators can be used.

The catalyst systems can include at least one non-coordinating anion (NCA) activator.

In at least one embodiment, boron containing NCA activators represented by the formula below can be used:

$$Z_d^+ (A^{d-})$$

where: Z is (L-H) or a reducible Lewis acid; L is a neutral Lewis base; H is hydrogen; (L-H)$^+$ is a Brønsted acid; A$^{d-}$ is a non-coordinating anion, for example a boron containing non-coordinating anion having the charge d−; and d is 1, 2, or 3.

The cation component, $Z_d^+$ may include Brønsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carboniums, ferroceniums and mixtures, such as carboniums and ferroceniums, such as $Z_d^+$ is triphenyl carbonium. Suitable reducible Lewis acids can be a triaryl carbonium (where the aryl can be substituted or unsubstituted, such as those represented by the formula: (Ar$_3$C$^+$), where Ar is aryl substituted with a C$_1$ to C$_{40}$ hydrocarbyl or with a substituted C$_1$ to C$_{40}$ hydrocarbyl, or a heteroaryl substituted with a C$_1$ to C$_{40}$ hydrocarbyl, or with a substituted C$_1$ to C$_{40}$ hydrocarbyl; such as the reducible Lewis acids in "Z" include those represented by the formula: (Ph$_3$C), where Ph is a substituted or unsubstituted phenyl, such as substituted with C$_1$ to C$_{40}$ hydrocarbyls or substituted a C$_1$ to C$_{40}$ hydrocarbyls, such as C$_1$ to C$_{20}$ alkyls or aromatics or substituted C$_1$ to C$_{20}$ alkyls or aromatics, such as Z is a triphenylcarbonium.

When $Z_d^+$ is the activating cation (L-H)$_d^+$, such as a Brønsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component A$^{d-}$ includes those having the formula [M$^{k+}$Q$_n$]$^{d-}$ wherein k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. In at least one embodiment, each Q is a fluorinated hydrocarbyl group having 1 to 20 carbon atoms, such as each Q is a fluorinated aryl group, such as each Q is a pentafluoryl aryl group. Examples of suitable A$^{d-}$ also include diboron compounds as disclosed in U.S. Pat. No. 5,447,895, which is fully incorporated herein by reference.

Examples of boron compounds which may be used as an activating cocatalyst include the compounds described as (and particularly those specifically listed as) activators in U.S. Pat. No. 8,658,556, which is incorporated by reference herein.

Bulky activators are also useful herein as NCAs. "Bulky activator" as used herein refers to anionic activators represented by the formula:

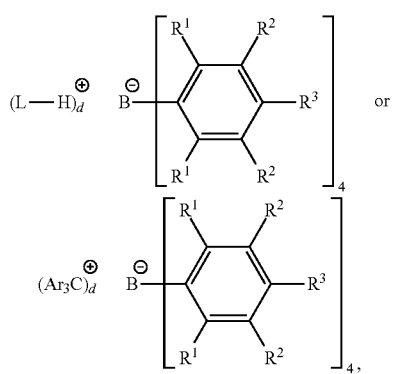

wherein:
each $R^1$ is, independently, a halide, such as a fluoride,
Ar is a substituted or unsubstituted aryl group (such as a substituted or unsubstituted phenyl), such as substituted with $C_1$ to $C_{40}$ hydrocarbyls, such as $C_1$ to $C_{20}$ alkyls or aromatics,
each $R^2$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (such as $R^2$ is a fluoride or a perfluorinated phenyl group),
each $R^3$ is a halide, $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (such as $R^3$ is a fluoride or a $C_6$ perfluorinated aromatic hydrocarbyl group); wherein $R^2$ and $R^3$ can form one or more saturated or unsaturated, substituted or unsubstituted rings (such as $R^2$ and $R^3$ form a perfluorinated phenyl ring), and
L is a neutral Lewis base; $(L-H)^+$ is a Brønsted acid; d is 1, 2, or 3,
wherein the anion has a molecular weight of greater than 1020 g/mol, and
wherein at least three of the substituents on the B atom each have a molecular volume of greater than 250 cubic Å, alternately greater than 300 cubic Å, or alternately greater than 500 cubic Å.

Suitable $(Ar_3C)_d^+$ is $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3$V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of particularly useful Bulky activators as described in U.S. Pat. No. 8,658,556, which is incorporated herein by reference.

In at least one embodiment, one or more of the NCA activators is chosen from the activators described in U.S. Pat. No. 6,211,105.

Suitable activators include N,N-dimethylanilinium tetrakis(perfluoronaphthyl)borate, N,N-dimethylanilinium tetrakis(perfluorophenyl)borate, triphenylcarbenium tetrakis(perfluorophenyl)borate, [Ph$_3$C$^+$][B(C$_6$F$_5$)4$^-$], [Me$_3$NH$^+$][B(C$_6$F$_5$)4$^-$], 1-(4-(tris(pentafluorophenyl)borate)-2,3,5,6-tetrafluorophenyl)pyrrolidinium, 4-(tris(pentafluorophenyl)borate)-2,3,5,6-tetrafluoropyridine.

In at least one embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate.

In at least one embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, iso-butyl, or t-butyl).

In at least one embodiment, the ionic activator $Z_d^+(A^{d-})$ is one or more of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, and tropillium tetrakis(perfluoronaphthyl)borate.

Useful bulky activators include those in Paragraph [0124] of US 2015/0025209, and also those in Columns 7 and 20-21 in U.S. Pat. No. 8,658,556, which descriptions are incorporated herein by reference. Particular examples of suitable NCA activators include: N,N-dimethylanilinium tetrakis (perfluorophenyl)borate; N,N-dimethylanilinium tetrakis (pentafluorophenyl)borate; N,N-dimethylanilinium tetrakis (perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis (perfluorobiphenyl)borate, triphenylcarbenium tetrakis (3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4]$; 1-(4-(tris(pentafluorophenyl)borate)-2,3,5,6-tetrafluorophenyl)pyrrolidinium; tetrakis(pentafluorophenyl)borate, 4-(tris(pentafluorophenyl)borate)-2,3,5,6-tetrafluoropyridine, bis($C_4$-$C_{20}$alkyl)methylammonium tetrakis(pentafluorophenyl)borate, bis(hydrogenated tallowalkyl)methylammonium tetrakis(pentafluorophenyl)borate, bis($C_4$-$C_{20}$alkyl)methylammonium tetrakis(perfluoronaphthyl)borate, bis(hydrogenated tallowalkyl)methylammonium tetrakis(perfluoronaphthyl)borate, N,N-dimethyl-4-octadecylbenzenaminium tetrakis(perfluoronaphthyl)borate, N-methyl-N-octadecylanilinium tetrakis(perfluoronaphthyl) borate, N-methyl-N-decylanilinium tetrakis(perfluoronaphthyl)borate, N,N-didecyl-4-methylanilinium tetrakis(perfluoronaphthyl)borate, N,N-didecyl-4-butylanilinium tetrakis(perfluoronaphthyl)borate, N-methyl-4-nonadecyl-N-octadecylanilinium tetrakis(perfluoronaphthyl)borate, N-ethyl-4-nonadecyl-N-octadecylanilinium tetrakis(perfluoronaphthyl)borate, N,N-dioctadecyl-N-methylammonium tetrakis(perfluoronaphthyl)borate.

In some embodiments, activators containing the tetrakis (perfluorophenyl)borate anion are preferred such as N,N-dimethylanilinium tetrakis(perfluorophenyl)borate, bis(hydrogenated tallowalkyl)methylammonium tetrakis (perfluorophenyl)borate, N,N-dimethyl-4-octadecylbenzenaminium tetrakis(perfluorophenyl)borate, N-methyl-N-octadecylanilinium tetrakis(perfluorophenyl) borate, and N-methyl-4-nonadecyl-N-octadecylanilinium tetrakis(perfluorophenyl)borate.

Suitable activator-to-catalyst ratio, e.g., all NCA activators-to-catalyst ratio is about a 1:1 molar ratio. Alternate suitable ranges include from about 0.1:1 to about 100:1, alternately from about 0.5:1 to about 200:1, alternately from about 1:1 to about 500:1, alternately from about 1:1 to about 1000:1. A particularly useful range is from about 0.5:1 to about 10:1, such as about 1:1 to about 5:1.

The catalyst compounds can be combined with combinations of alumoxanes and NCA's (see for example, U.S. Pat. Nos. 5,153,157, 5,453,410, EP 0 573 120 B1, WO 94/07928, and WO 95/14044 which discuss the use of an alumoxane in combination with an ionizing activator).

Alternately, a co-activator or chain transfer agent, such as a group 1, 2, or 13 organometallic species (e.g., an alkyl aluminum compound such as tri-n-octyl aluminum), may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Optional Scavengers or Co-Activators

In addition to these activator compounds, one or more scavengers or co-activators may be used in the catalyst system. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc. Those scavengers having bulky or $C_6$ to $C_{20}$ linear hydrocarbyl substituents connected to the metal or metalloid center usually minimize adverse interaction with the active catalyst. Examples include triethylaluminum, such as bulky compounds, such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavengers may be unnecessary. Alumoxanes also may be added in scavenging quantities with other activators, e.g., methylalumoxane, $[Me_2HNPh]^+[B(pfp)_4]$– or $B(pfp)_3$ (perfluorophenyl=pfp=$C_6F_5$). In at least one embodiment, the scavengers are present at less than about 14 wt %, or from about 0.1 wt % to about 10 wt %, or from about 0.5 wt % to about 7 wt %, by weight of the catalyst system.

Suitable aluminum alkyl or organoaluminum compounds that may be utilized as co-activators include, for example, trimethylaluminum, triethylaluminum, tri-iso-butylaluminum, tri-n-hexylaluminum, or tri-n-octylaluminum. In an embodiment, the co-activators are present at less than about 14 wt %, or from about 0.1 wt % to about 10 wt %, or from about 0.5 to about 7 wt %, by weight of the catalyst system. Alternately, the complex-to-co-activator molar ratio is from about 1:100 to about 100:1; about 1:75 to about 75:1; about 1:50 to about 50:1; about 1:25 to about 25:1; about 1:15 to about 15:1; about 1:10 to about 10:1; about 1:5 to about 5:1; about 1:2 to about 2:1; about 1:100 to about 1:1; about 1:75 to about 1:1; about 1:50 to about 1:1; about 1:25 to about 1:1; about 1:15 to about 1:1; about 1:10 to about 1:1; about 1:5 to about 1:1; about 1:2 to about 1:1; about 1:10 to about 2:1.

Polymerization Processes

The ethylene copolymers employed in the compositions of the present invention can be prepared by the process above where the ethylene, the one or more $C_3$ to $C_{20}$ alpha-olefins, the activator, and the transition metal complex are contacted under polymerization conditions with the chain transfer agent. In at least one embodiment, the polymerization is performed in two stages, with the chain transfer agent being introduced in the first stage. The two stages may be two continuous stirred tank reactors connected in series or the two stages may be different zones of a tubular reactor. Alternatively, the two stages may be earlier and later times during a polymerization conducted in a stirred reactor or in a batch process.

The catalysts and catalyst systems described herein are useful in polymerizing unsaturated monomers conventionally known to undergo transition metal catalyzed solution polymerization.

One or more reactors in series or in parallel may be used. The complexes, hydrocarbenyl chain transfer agent, activator, and when desired, co-activator, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to a first reactor and another component to other reactors. In at least one embodiment, the complex is activated in the reactor in the presence of olefin.

In at least one embodiment, the polymerization process is a continuous process.

In at least one embodiment, a method of polymerizing olefins to produce at least one polyolefin composition is provided. The method includes contacting at least one olefin with a catalyst system of the present disclosure; and obtaining a polyolefin. If an activator(s) is used, the catalyst compounds and activator(s) may be combined in any order, and are combined prior to contacting with the monomer (such as ethylene).

Alpha-Olefin Monomers

Suitable monomers and comonomers may include substituted or unsubstituted $C_2$ to $C_{40}$ alpha-olefins, such as $C_2$ to $C_{20}$ alpha-olefins, such as $C_2$ to $C_{12}$ alpha olefins, such as ethylene, propylene, butene, pentene, hexene, heptene, octene, nonene, decene, undecene, dodecene and isomers thereof, and combinations thereof. In at least one embodiment of the present disclosure, the monomer includes propylene and an optional comonomer comprising one or more $C_3$ to $C_{40}$ olefins, such $C_3$ to $C_{20}$ olefins, such as $C_3$ to $C_{12}$ olefins. The $C_4$ to $C_{40}$ olefin monomers may be linear, branched, or cyclic. The $C_5$ to $C_{40}$ cyclic olefins may be strained or unstrained, monocyclic or polycyclic. In at least one embodiment, the monomer is ethylene and the comonomer is propylene.

In at least one embodiment, one or more dienes are present in the polymer produced herein at up to about 10 wt %, such as at about 0.00001 wt % to about 1.0 wt %, such as about 0.002 wt % to about 0.5 wt %, such as about 0.003 wt % to about 0.2 wt %, based upon the total weight of the composition. In at least one embodiment, about 500 ppm or less of diene is added to the polymerization, such as about 400 ppm or less, such as about 300 ppm or less. In other embodiments at least about 50 ppm of diene is added to the polymerization, or about 100 ppm or more, or about 150 ppm or more. Suitable diolefin monomers can be $C_4$ to $C_{30}$, having at least two unsaturated bonds, where at least two of the unsaturated bonds are readily incorporated into a polymer by either a stereospecific or a non-stereospecific catalyst(s). In at least one embodiment, the diolefin monomers can be selected from alpha, omega-diene monomers (i.e. di-vinyl monomers). In at least one embodiment, the diolefin monomers are linear di-vinyl monomers, such as those containing from 4 to 30 carbon atoms. Examples of suitable dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly suitable dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Suitable cyclic dienes include cyclopentadiene, vinylnorbornene, norbornadiene, ethylidene norbornene, divinylbenzene, dicyclopentadiene or higher ring containing diolefins with or without substituents at various ring positions.

The polymerization processes can be carried out in any suitable manner known in the art. Any suspension, homogeneous, bulk, solution, slurry, or gas phase polymerization process known in the art can be used. Such processes can be run in a batch, semi-batch, or continuous mode. In at least one embodiment, homogeneous polymerization processes and slurry processes are employed. A homogeneous polymerization process is defined to be a process where at least about 90 wt % of the product is soluble in the reaction media. In at least one embodiment, suitable process can be a bulk homogeneous process. A bulk process is defined to be a process where monomer concentration in all feeds to the reactor is about 70 vol % or more. Alternately, no solvent or diluent is present or added in the reaction medium, (except for the small amounts used as the carrier for the catalyst system or other additives, or amounts found with the monomer; e.g., propane in propylene). In at least one embodiment, a method of polymerizing olefins to produce at least one polyolefin composition includes contacting at least one olefin with a catalyst system of the present disclosure; and obtaining a polyolefin. A method of polymerizing olefins can include introducing any catalyst system described herein into a reactor as a slurry.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins that may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, such as aromatics are present in the solvent at less than about 1 wt %, such as less than about 0.5 wt %, such as less than about 0 wt % based upon the weight of the solvents.

In at least one embodiment, the feed concentration of the monomers and comonomers for the polymerization is about 60 vol % solvent or less, such as about 40 vol % or less, or such as about 20 vol % or less, based on the total volume of the feedstream. In at least one embodiment, the polymerization is run in a bulk process.

Suitable polymerizations can be run at any temperature and/or pressure suitable to obtain the desired ethylene polymers. In at least one embodiment, temperatures and/or pressures include a temperature in the range of from about 0° C. to about 300° C., such as about 30° C. to about 200° C., such as about 60° C. to about 195° C., such as from about 75° C. to about 190° C., such as from about 80° C. to about 100° C.; and at a pressure in the range of from about 0.35 MPa to about 1500 MPa, such as from about 0.45 MPa to about 100 MPa, such as from about 0.5 MPa to about 50 MPa, such as from about 1.7 MPa to about 30 MPa. In at least one embodiment, suitable run time of the polymerization reaction is up to about 300 minutes, such as in the range of from about 0 to about 250 minutes, such as from about 0 to about 120 minutes, such as in the range of from about 0 to about 30 minutes, such as about 0 to about 10 minutes.

In at least one embodiment, hydrogen is present in the polymerization reactor at a partial pressure of about 0.001 psig to about 50 psig (about 0.007 kPa to about 345 kPa), such as from about 0.01 psig to about 25 psig (about 0.07 kPa to about 172 kPa), such as about 0.1 psig to about 10 psig (about 0.7 kPa to about 70 kPa).

In at least one embodiment, little or no alumoxane is used in the process to produce the polymers. In at least one embodiment, alumoxane is present at about zero mol %, alternately the alumoxane is present at a molar ratio of aluminum to transition metal less than about 500:1, such as less than about 300:1, such as less than about 100:1, such as less than about 1:1.

In at least one embodiment, little or no scavenger is used in the process to produce the ethylene polymer. In at least one embodiment, scavenger (such as tri alkyl aluminum) is present at about zero mol %, alternately the scavenger is present at a molar ratio of scavenger metal to transition metal of less than about 100:1, such as less than about 50:1, such as less than about 15:1, such as less than about 10:1.

In at least one embodiment, the polymerization: 1) is conducted at temperatures of about 0° C. to about 300° C. (such as about 25° C. to about 150° C., such as about 80° C. to about 150° C., such as about 100° C. to about 140° C.); 2) is conducted at a pressure of atmospheric pressure to about 50 MPa; 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than about 1 wt %, such as less than about 0.5 wt %, such as at about 0 wt % based upon the weight of the solvents); 4) wherein the catalyst system used in the polymerization includes less than about 0.5 mol %, such as about 0 mol % alumoxane, alternately the alumoxane is present at a molar ratio of aluminum to transition metal less than about 500:1, such as less than about 300:1, such as less than about 100:1, such as less than about 1:1; 5) in at least one embodiment, the polymerization occurs in one reaction zone. In at least one embodiment, the polymerization uses a single reactor. Room temperature is about 23° C. unless otherwise noted.

Other additives may also be used in the polymerization, as desired, such as one or more scavengers, promoters, modifiers, hydrogen, chain transfer agents (including zinc and aluminum-based chain transfer agents such as diethyl zinc), reducing agents, oxidizing agents, hydrogen, aluminum alkyls, or silanes.

Suitable chain transfer agents can be trialkylaluminums and dialkylzincs, which are represented by the formulas $AlR_3$ and $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

In at least one embodiment the quinolinyldiamido transition metal complex is (QDA-1)$HfMe_2$

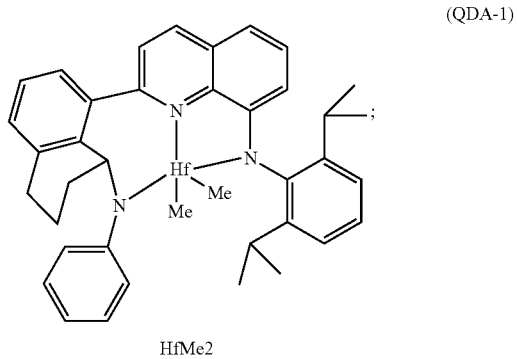

HfMe2 and the activator is N,N-dimethylanilinium tetrakis(pentafluorophenyl)borate (BF20).

Solution Polymerization

A solution polymerization is a polymerization process in which the polymer is dissolved in a liquid polymerization medium, such as an inert solvent or monomer(s) or their blends. A solution polymerization is homogeneous. A homogeneous polymerization is one where the polymer product is dissolved in the polymerization medium. Such systems are not turbid as described in J. Vladimir Oliveira, C. Dariva and J. C. Pinto, Ind. Eng, Chem. Res. 29, 2000, 4627. Generally, solution polymerization involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes operate at temperatures from about 0° C. to about 250° C., such as from about 10° C. to about 150° C. and at pressures of about 0.1 MPa or more, such as about 2 MPa or more. In at least one embodiment, the upper pressure limit is about 200 MPa or less, such as about 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can also be introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

Polyolefin Products and Lubricant Compositions

This disclosure also relates to compositions of matter produced by the methods described herein. In at least one embodiment, the catalyst systems and methods herein produce polyolefins.

In at least one embodiment, a copolymer has an ethylene content of less than about 85 wt %, such as less than about 70 wt %, such as less than 65 wt %, such as less than about 55 wt %, such as less than 45 wt %, such as from about 20 wt % to about 90 wt %, alternatively from about 30 wt % to 80 wt %, alternatively from about 40 wt % to 75 wt %. In at least one embodiment, the copolymer has an Mw(LS) of from about 20,000 g/mol to about 600,000 g/mol, such as about 40,000 g/mol to about 550,000 g/mol, such as about 50,000 to about 525,000 g/mol, such as from about 52,000 g/mol to about 515,000 g/mol; and a PDI (Mw(LS)/Mn (DRI)) of from about 1.5 to about 6, such as from about 2.0 to about 5.0, such as from about 3.0 to about 4.5.

In at least one embodiment, the copolymers described herein have an Mn(LS) value of from about 10,000 g/mol to about 200,000 g/mol, such as from about 20,000 g/mol to about 150,000, such as from about 35,000 g/mol to about 135,000 g/mol; and Mw(LS) of from about 20,000 g/mol to about 600,000 g/mol, such as from about 30,000 g/mol to about 500,000 g/mol, such as from about 35,000 g/mol to about 350,000 g/mol; an Mz (LS) of from about 100,000 g/mol to about 1,500,000 g/mol, such as from about 120,000 g/mol to about 1,250,000 g/mol, such as from about 150,000 g/mol to about 1,100,000 g/mol; an Mn(DRI) of from about 10,000 g/mol to about 200,000 g/mol, such as from about 20,000 g/mol to about 150,000 g/mol, such as from about 30,000 g/mol to about 120,000 g/mol; an Mw(DRI) of from about 30,000 g/mol to about 350,000 g/mol, such as from about 40,000 g/mol to about 300,000 g/mol, such as from about 90,000 g/mol to about 250,000 g/mol; Mz(DRI) of from about 50,000 g/mol to about 800,000 g/mol, such as from about 80,000 g/mol to about 700,000 g/mol, such as from about 100,000 g/mol to about 600,000 g/mol.

In at least one embodiment, a copolymer has a melt flow rate ((MFR, ASTM D1238, Condition L, 230° C. and 2.16 kg) of from about 0.1 g/10 min to about 90 g/10 min, such as from about 0.2 g/10 min to about 85 g/10 min, such as from about 0.3 g/10 min to about 80 g/10 min; an MFR HL of from about 0.0 g/10 min to about 150 g/10 min, such as from about 0.2 g/10 min to about 120 g/10 min, such as from about 0.3 g/10 min to about 90 g/10 min.

In at least one embodiment, the copolymer has a $g'_{vis}$ from about 0.70 to 0.98, alternatively from 0.75 to 0.97, alternatively form 0.80 to 0.95, alternatively form 0.79 to 0.94, such as from about 0.80 to about 0.92, such as from about 0.81 to about 0.91. In some embodiments, the $g'_{vis}$ is less than 0.98, alternatively less than 0.95, alternatively less than 0.90, alternatively less than 0.85.

In at least one embodiment, the long chain branched copolymer has a shear thinning ratio greater than 8*EXP (8E-06*w) where w is the Mw(LS) from light scattering GPC-3D.

For branched ethylene-propylene copolymers that exhibit a polymer melting temperature (Tm), the heat of fusion (J/g) of the ethylene-propylene copolymer correlates to the amount of ethylene in the polymer. In at least one embodiment, the long chain branched copolymer has a Heat of Fusion (J/g) less than 2.2x-110 where x is the wt % ethylene as measured by FTIR ASTM D3900.

In an alternative embodiment, the inventive polymers have low crystallinity with at heat of fusion of the ethylene-propylene copolymer of less than 10 J/g, alternatively less than 8 J/g, alternatively less than 6 J/g, alternatively less than 4 J/g, alternatively less than 2 J/g, alternatively less than 1 J/g, alternatively 0 J/g as measured by DSC.

In still another aspect, the branched ethylene-propylene copolymers described herein have a glass transition temperature (Tg) within the range of from −70 or −60 or −50° C. to −20 or −10 or 0° C. In some embodiments, the branched ethylene-propylene copolymers described herein have a Tg from about −65 to −35° C., alternatively from about −60 to −45° C.

In still another aspect, the branched ethylene-propylene copolymers described herein have a melting point (Tm) within the range of from −40 or −30 or or −20 or −10° C. to 10 or 20 or 30 or 40° C.

The ethylene copolymers in some embodiments comprises one or more ethylene copolymers (a blend of two or more ethylene copolymers), each ethylene copolymer comprising units derived from two or more different C2-C12 alpha-olefins. Preferably, the ethylene contents of the ethylene copolymers are different. More preferably, one ethylene copolymer has ethylene content in a range of rom 40 to 55 wt. %, and another ethylene copolymer has ethylene content in a range of rom 50 to 75 wt. %. In one embodiment, both ethylene copolymers have long chain branched architecture with g'vis in a range of from 0.50 to 0.97. Alternatively, only one ethylene co-polymers is branched.

In embodiments where the copolymer is a reactor blended polymer, the copolymer may comprise from 40 to 55 wt % of the first polymer component, from 5 to 40 wt % of the second polymer component, based on the weight of the copolymer, where desirable ranges may include ranges from any lower limit to any upper limit. The copolymer may comprise from 55 to 97 wt % of the first polymer component, from 60 to 95 wt % of the first polymer component, from 65 to 92.5 wt % of the first polymer component, based on the weight of the copolymer, where desirable ranges may include ranges from any lower limit to any upper limit. In one embodiment, the reactor blend is produced in a system with parallel reactors. Alternatively, the reactor blend is produced in a series reactors.

In one embodiment of polymer compositions, the content of diene with at least two polymerizable bonds in the inventive polymer composition is less than 0.5 wt. %, preferably less than 0.1 wt. % of the copolymer. In another embodiment, the long chain branched ethylene copolymer is free of diene.

In at least one embodiment, the lubricant composition comprising an oil and a long chain branched copolymer has a ratio of thickening efficiency (TE) to shear stability index (SSI) (30 cycles) of from about 1:2 to about 1:30 (such as from about 1:5 to about 1:25, such as about 1:6 to about 1:20, such as about 1:7 to about 1:18, such as about 1:8 to about 1:16). In at least one embodiment, the copolymer has a shear stability index at 30 cycles of from about 2% to about 80%, (such as from about 2.5% to about 75%, such as from about 3% to about 60%).

In at least one embodiment, the lubricant composition has a shear stability index at 30 cycles of greater than 3%, alternatively greater than 10%, alternatively greater than 20%, alternatively greater than 30%.

In at least one embodiment, the lubricant composition comprising an oil and a long chain branched copolymer has a high temperature, high shear (HTHS) viscosity (cP) of less than about 5 cP, such as from about 1.5 cP to about 5 cP, such as from about 2 cP to about 4.5 cP. High temperature, high shear (HTHS) viscosity is typically measured at 150° C. and $10^{\char`\^}6$ $s^{-1}$. The HTHS is used to evaluate lubricating oil performance at high temperatures at a high shear rate. The high-temperature high-shear viscosity can be measured at according to ASTM D4683.

In at least one embodiment, the lubricant composition comprising an oil and a long chain branched copolymer described herein has a kinematic viscosity at 100° C. (KV100), as measured by ASTM D445, of about 3 cSt to about 30 cSt, such as of about 6 cSt to about 28 cSt, such as about 7 cSt to about 25 cSt, such as 8 cSt to about 25 cSt.

In at least one embodiment, the lubricant composition comprising an oil an a long chain branched copolymers described herein has a kinematic viscosity at 40° C. (KV40), as measured by ASTM D445, of about 30 cSt to about 200 cSt, such as 40 cSt to about 175 cSt, such as about 60 cSt to about 120 cSt.

Further, in at least one embodiment, the lubricant composition comprising an oil and a long chain branched copolymers described herein have a thickening efficiency of about 1 or greater, such as from about 1 to about 6, such as from about 1 to about 5.5, such as from about 1.0 to about 5, about 1.5 or greater, such as about 2 to about 4.

In at least one embodiment, the lubricant composition comprises an oil and a long chain branched copolymer as described herein.

In another class of embodiments, the present disclosure provides a lubricant composition comprising a first and a second copolymers wherein the first copolymer has an ethylene content higher than that of the second copolymer, and at least one of the two copolymers is a long chain branched copolymer. The copolymers are preferably ethylene propylene copolymers.

The following further embodiments are contemplated as within the scope of the present disclosure.

Embodiment A—A lubricant composition comprising an oil and a long chain branched copolymer having: a shear stability index (30 cycles) of from about 2% to about 80%; and a kinematic viscosity at 100° C. of from about 3 cSt to about 30 cSt wherein the copolymer has: a Mw(LS)/Mn (DRI) from about 1.5 to about 6; a Mw(LS) from about 20,000 to about 600,000 g/mol; a $g'_{vis}$ of from about 0.7 to about 0.98; an ethylene content of about 20 wt % to about 90 wt %; and wherein the copolymer comprises a remnant of a metal hydrocarbenyl chain transfer agent wherein the metal hydrocarbenyl chain transfer agent is represented by formula: $Al(R')_{3-v}(R'')_v$ wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

Embodiment B—The composition of Embodiment A, wherein the copolymer has an ethylene content of about 30 wt % to about 80 wt %.

Embodiment C—The composition of Embodiments A or B, wherein the copolymer has an ethylene content of about 40 wt % to about 75 wt %.

Embodiment D—The composition of any of Embodiments A-C, wherein the copolymer has an Mw(LS)/Mn (DRI) from about 2.0 to about 5.0.

Embodiment E—The composition of any of Embodiments A-D, wherein the kinematic viscosity at 100° C. is from about 6 cSt to about 28 cSt.

Embodiment F—The composition of any of Embodiments A-E, wherein the kinematic viscosity at 100° C. is from about 7 cSt to about 25 cSt.

Embodiment G—The composition of any of Embodiments A-F, wherein the copolymer has a shear stability index (30 cycles) of about 3% or greater.

Embodiment H—The composition of any of Embodiments A-G, wherein the copolymer has a shear stability index (30 cycles) of about 20% or greater.

Embodiment I—The composition of any of Embodiments A-H, wherein the copolymer has a shear stability index (30 cycles) of about 30% or greater.

Embodiment J—The composition of any of Embodiments A-I, wherein the copolymer has a thickening efficiency of about 1 or greater.

Embodiment K—The composition of any of Embodiments A-J, wherein the copolymer has a thickening efficiency of about 1.5 or greater.

Embodiment L—The composition of any of Embodiments A-K, wherein the composition comprises about 0.01 wt % to about 20 wt % of the copolymer.

Embodiment M—The composition of any of Embodiments A-L, wherein the composition comprises about 0.01 wt % to about 5 wt % of the copolymer.

Embodiment N—The composition of any of Embodiments A-M, wherein the oil comprises a hydrocarbon, polyalphaolefin, alkyl esters of dicarboxylic acids, polyglycols, alcohols, polybutenes, alkylbenzenes, organic esters of phosphoric acids, polysilicone oils, or combinations thereof.

Embodiment O—The composition of any of Embodiments A-N, wherein the composition has a high temperature, high shear (HTHS) viscosity of about 5 or less.

Embodiment P—The lubricant composition of any of Embodiments A-O, further comprising at least one of a dispersant, a detergent, an antioxidant, an oiliness improver, as pour point depressant, a friction modifier, a wear modifier, an extreme pressure additive, a defoamer, a demulsifier, or a corrosion inhibitor.

Embodiment Q—The composition of any of Embodiments A-P, wherein the composition has a second copolymer having an ethylene content less than the ethylene content of the first copolymer and wherein at least one copolymer is a long chain branched copolymer.

Embodiment R—The composition of any of Embodiments A-Q, wherein the long chain branched ethylene copolymer has a shear thinning ratio greater than 8*EXP(8E-06*w) where w is the Mw(LS) from light scattering GPC-3D.

Embodiment S—The composition of any of Embodiments A-R, wherein the copolymer has a Heat of Fusion (J/g) less than 2.2x-110 where x is the wt. % ethylene as measured by FTIR.

Embodiment T—The composition of any of Embodiments A-S, wherein the copolymer is an ethylene propylene copolymer.

Embodiment U—The composition of any one of Embodiment A-T, wherein the copolymer was made from metal hydrocarbenyl chain transfer agent wherein the metal hydrocarbenyl chain transfer agent is represented by formula: $Al(R')_{3-v}(R'')_v$ wherein each R', independently, is a $C_4$-$C_{10}$ hydrocarbyl group; each R", independently, is a $C_8$-$C_{10}$ hydrocarbenyl group having an end-vinyl group; and v is from 0.1 to 3.

Embodiment V—The composition of any one of Embodiments A-T, wherein the copolymer was made from a metal hydrocarbenyl chain transfer agent wherein the metal hydrocarbenyl chain transfer agent is represented by formula: $Al(R')_{3-v}(R'')_v$ wherein each R', independently, is a $C_4$ hydrocarbyl group; each R", independently, is a $C_{10}$ hydrocarbenyl group having an end-vinyl group; and v is from 1 to 3.

Embodiment W—The composition of any one of Embodiments A-T, wherein the copolymer comprises a remnant of a metal hydrocarbenyl chain transfer agent wherein the metal hydrocarbenyl chain transfer agent is represented by formula: $Al(R')_{3-v}(R'')_v$ wherein each R', independently, is a $C_4$ hydrocarbyl group; each R", independently, is a $C_8$ hydrocarbenyl group having an end-vinyl group; and v is from 1 to 3.

Embodiment X—A method of making a lubricant composition comprising: blending an oil with a long chain branched copolymer, the composition having: a shear stability index (30 cycles) of from about 2% to about 80%; and a kinematic viscosity at 100° C. of from about 3 cSt to about 30 cSt, and wherein the copolymer has: a Mw(LS)/Mn(DRI) from about 1.5 to about 6; a Mw(LS) from about 20,000 to about 600,000 g/mol; a g'vis of from about 0.7 to about 0.98; and an ethylene content of about 20 wt % to about 90 wt %, and wherein the copolymer was made from a metal hydrocarbenyl chain transfer agent wherein the metal hydrocarbenyl chain transfer agent is represented by formula: $Al(R')_{3-v}(R'')_v$, wherein each R', independently, is a $C_1$-$C_{30}$ hydrocarbyl group; each R'', independently, is a $C_4$-$C_{20}$ hydrocarbenyl group having an end-vinyl group; and v is from 0.1 to 3.

Embodiment X—A method of lubricating an engine, comprising: supplying to the engine a lubricant composition comprising an oil and a long chain branched copolymer having: a shear stability index (30 cycles) of from about 2% to about 80%; and a kinematic viscosity at 100° C. of from about 3 cSt to about 30 cSt wherein the copolymer has: a Mw(LS)/Mn(DRI) from about 1.5 to about 6; a Mw(LS) from about 20,000 to about 600,000 g/mol; a g'vis of from about 0.7 to about 0.98; an ethylene content of about 20 wt % to about 90 wt %; and wherein the copolymer comprises a remnant of a metal hydrocarbenyl chain transfer agent wherein the metal hydrocarbenyl chain transfer agent is represented by formula: Al(R')3-v(R'')v wherein each R', independently, is a C1-C30 hydrocarbyl group; each R'', independently, is a C4-C20 hydrocarbenyl group having an end-vinyl group; and v is from 0.1 to 3.

Embodiment Y—A method of lubricating an engine comprising supplying to the engine a_lubricant composition according to any one of Embodiments A to W Lubrication Oil Compositions Lubricating oil compositions containing the long chain branched copolymer produced herein and one or more base oils (or base stocks) are provided. The base stock can be or include natural or synthetic oils of lubricating viscosity, whether derived from hydrocracking, hydrogenation, other refining processes, unrefined processes, or re-refined processes. The base stock can be or include used oil. Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils.

In at least one embodiment, the base stock is or includes a polyalphaolefin (PAO) including a PAO-2, PAO-4, PAO-5, PAO-6, PAO-7 or PAO-8 (the numerical value relating to Kinematic Viscosity at 100° C., ASTM D445). In at least one embodiment, the polyalphaolefin can be prepared from dodecene and/or decene. Generally, the polyalphaolefin suitable as an oil of lubricating viscosity has a viscosity less than that of a PAO-20 or PAO-30 oil. In at least one embodiment, the base stock can be defined as specified in the American Petroleum Institute (API) Base Oil Interchangeability Guidelines. For example, the base stock can be or include an API Group I, II, III, IV, and V oil or mixtures thereof.

In at least one embodiment, the base stock can include oil or blends thereof conventionally employed as crankcase lubricating oils. For example, suitable base stocks can include crankcase lubricating oils for spark-ignited and compression-ignited internal combustion engines, such as automobile and truck engines, marine and railroad diesel engines, and the like. Suitable base stocks can also include those oils conventionally employed in and/or adapted for use as power transmitting fluids such as automatic transmission fluids, tractor fluids, universal tractor fluids and hydraulic fluids, heavy duty hydraulic fluids, power steering fluids and the like. Suitable base stocks can also be or include gear lubricants, industrial oils, pump oils and other lubricating oils.

In at least one embodiment, the base stock can include not only hydrocarbon oils derived from petroleum, but also include synthetic lubricating oils such as esters of dibasic acids; complex esters made by esterification of monobasic acids, polyglycols, dibasic acids and alcohols; polyolefin acids, polyglycols, dibasic acids and alcohols; polyolefin oils, etc. Thus, the lubricating oil compositions described can be suitably incorporated into synthetic base oil base stocks such as alkyl esters of dicarboxylic acids, polyglycols and alcohols; polyalphaolefins; polybutenes; alkyl benzenes; organic esters of phosphoric acids; polysilicone oils.

The lubricating oil compositions of the invention can optionally contain one or more conventional additives, such as, for example, pour point depressants, anti-wear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative corrosion inhibitors include phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a C2 to C6 olefin polymer such as polyisobutylene, with from 5 to 30 wt % of a sulfide of phosphorus for 0.5 to 15 hours, at a temperature in the range of 66° C. to 316° C. Neutralization of the phosphosulfurized hydrocarbon may be effected in the manner known by those skilled in the art.

Oxidation inhibitors, or antioxidants, reduce the tendency of mineral oils to deteriorate in service, as evidenced by the products of oxidation such as sludge and varnish-like deposits on the metal surfaces, and by viscosity growth. Such oxidation inhibitors include alkaline earth metal salts of alkylphenolthioesters having C5 to C12 alkyl side chains, e.g., calcium nonylphenate sulfide, barium octylphenate sulfide, dioctylphenylamine, phenylalphanaphthylamine, phosphosulfurized or sulfurized hydrocarbons, etc. Other oxidation inhibitors or antioxidants useful in this invention include oil-soluble copper compounds, such as described in U.S. Pat. No. 5,068,047.

Friction modifiers serve to impart the proper friction characteristics to lubricating oil compositions such as automatic transmission fluids. Representative examples of suitable friction modifiers are found in U.S. Pat. No. 3,933,659, which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di-(lower alkyl)phosphites and epoxides; and U.S. Pat. No. 4,028,258 which discloses the alkylene oxide adduct of phosphosulfurized N-(hydroxyalkyl)alkenyl succinimides. Preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid, thus preventing sludge flocculation and precipitation or deposition on metal parts. Suitable dispersants include high molecular weight N-substituted alkenyl succinimides, the reaction product of oil-soluble polyisobutylene succinic anhydride with ethylene amines such as tetraethylene pentamine and borated salts thereof. High molecular weight esters (resulting from the esterification of olefin substituted succinic acids with mono or polyhydric aliphatic alcohols) or Mannich bases from high molecular weight alkylated phenols (resulting from the condensation of a high molecular weight alkylsubstituted phenol, an alkylene polyamine and an aldehyde such as formaldehyde) are also useful as dispersants.

Pour point depressants ("PPD"), otherwise known as lube oil flow improvers, lower the temperature at which the fluid will flow or can be poured. Any suitable pour point depressant known in the art can be used. For example, suitable pour point depressants include, but are not limited to, one or more C8 to C18 dialkylfumarate vinyl acetate copolymers, polymethyl methacrylates, alkylmethacrylates and wax naphthalene.

Foam control can be provided by any one or more anti-foamants. Suitable anti-foamants include polysiloxanes, such as silicone oils and polydimethyl siloxane.

Anti-wear agents reduce wear of metal parts. Representatives of conventional antiwear agents are zinc dialkyldithiophosphate and zinc diaryldithiosphate, which also serve as an antioxidant.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents.

When lubricating oil compositions contain one or more of the components discussed above, the additive(s) are blended into the composition in an amount sufficient for it to perform its intended function. Typical amounts of such additives useful in the present invention are shown in Table A below.

TABLE A

Typical Amounts of Various Lubricating Oil Components

| Compound | Approximate wt % (useful) | Approximate wt % (preferred) |
| --- | --- | --- |
| Detergents | 0.01-8 | 0.01-4 |
| Dispersants | 0.1-20 | 0.1-8 |
| Antiwear agents | 0.01-6 | 0.01-4 |
| Friction Modifiers | 0.01-15 | 0.01-5 |
| Antioxidants | 0.01-5 | 0.1-2 |
| Pour Point Depressants | 0.01-5 | 0.1-1.5 |
| Anti-foam Agents | 0.001-1 | 0-0.2 |
| Corrosion Inhibitors | 0-5 | 0-1.5 |
| Other Viscosity Improvers (solid polymer basis) | 0.25-10 | 0.25-5 |

When other additives are used, it may be desirable, although not necessary, to prepare additive concentrates that include concentrated solutions or dispersions of the VI improver (in concentrated amounts), together with one or more of the other additives, such a concentrate denoted an "additive package," whereby several additives can be added simultaneously to the base stock to form a lubrication oil composition. Dissolution of the additive concentrate into the lubrication oil can be facilitated by solvents and by mixing accompanied with mild heating, but this is not essential. The additive-package can be formulated to contain the VI improver and optional additional additives in proper amounts to provide the desired concentration in the final formulation when the additive-package is combined with a predetermined amount of base oil.

Also, it may be desirable to store and transport the long chain branched copolymers of the present disclosure as concentrates. In concentrates, the copolymer is typically mixed with a diluent oil. The diluent oil may comprise a Group I, Group II, Group III, Group IV or Group V oil or blends of the aforementioned oils. The diluent oil may also comprise a blend of a Group I oil and one or more Group II, Group III, Group IV or Group V oil. In some embodiments, the concentrate may include 0.5 wt. % to 20 wt. % of the long chain branched copolymers.

Blending with Base Stock Oils

A solution blending with AC-150™ Group I base oil is obtained by heating AC-150™ Group I base oil at high temperature, such as 130° C., followed by the addition of the polymer and optional antioxidant. The mixture can be stirred until complete dissolution of the polymers and is then cooled to room temperature. The solubility behavior is recorded at room temperature.

Thickening efficiency (TE) is a relative measure of the thickening ability of the polymer in oil, and is defined as: $TE=2/c \times \ln((kv_{(polymer+oil)})/kv_{oil})/\ln(2)$, where c is the concentration of the polymer and kv is kinematic viscosity at 100° C. according to ASTM D445. The shear stability index (SSI) is an indication of the resistance of polymers to permanent mechanical shear degradation in an engine. The SSI can be determined by passing a polymer-oil solution for 30 cycles through a high shear Bosch diesel injector according to the procedures listed in ASTM D6278.

The polymer can have a thickening efficiency greater than about 1, or greater than about 1.5, or greater than about 1.9, or greater than about 2.2, or greater than about 2.4 or greater than about 2.6. The polymer can have a shear stability index of less than 70% such as less than 60%, such as less than 50%. The polymer can have a complex viscosity at about 190° C. and 0.01 rad/s of less than about $10^{\wedge 7}$ Pa·s, or less than about $6 \times 10^{\wedge 6}$ Pa·s. As used herein, the term "complex viscosity" means a frequency-dependent viscosity function determined during forced small amplitude harmonic oscillation of shear stress, in units of Pascal-seconds, that is equal to the difference between the dynamic viscosity and the out-of-phase viscosity.

The copolymers produced herein have a shear stability index (SSI) (determined according to ASTM D6278, 30 cycles) of from about 2% to about 80%, such as about 3% to about 60%.

In at least one embodiment, the present disclosure provides a lubrication composition including: an oil and a copolymer having: 1) an Mw(LS)/Mn(DRI) is from about 1.5 to about 6; 2) an Mw(LS) is from about 20,000 to about 600,000 g/mol; 3) a $g'_{vis}$ of from about 0.7 to about 0.98; 4) an ethylene content of about 20 wt % to about 90 wt %.

In at least one embodiment, the present disclosure provides a lubrication composition including an oil and a copolymer wherein the copolymer has an ethylene content of about 40 wt % to about 85 wt %, an Mw(LS)/Mn(DRI) from about 3 to about 4.5.

In at least one embodiment, the present disclosure provides a lubrication composition, including an oil and a copolymer, having 1) a shear stability index (30 cycles) of from about 2% to about 80%; and 2) a kinematic viscosity at 100° C. of from about 7 cSt to about 25 cSt.

In at least one embodiment, the present disclosure provides a lubrication composition having a kinematic viscosity at 100° C. of from about 7 cSt to about 25 cSt, a shear stability index (30 cycles) about 3% to about 80%, a thickening efficiency of about 1 or greater, a shear thinning onset of about 0.01 rad/s or less.

In at least one embodiment, the present disclosure provides a lubrication composition where the composition includes 0.01 wt % to 12 wt % of the copolymer.

In at least another embodiment, the present disclosure provides a lubrication composition where the composition includes 0.01 wt % to 5 wt % of the copolymer.

In at least one embodiment, the present disclosure provides a lubrication composition where the oil includes a hydrocarbon, polyalphaolefin, alkyl esters of dicarboxylic acids, polyglycols, alcohols, polybutenes, alkylbenzenes, organic esters of phosphoric acids, polysilicone oils, or combinations thereof.

In at least one embodiment, the present disclosure provides a lubrication composition where the composition has a high temperature, high shear (HTHS) viscosity of about 5 cP or less, a ratio of thickening efficiency to shear stability index (30 cycles) of from about 1:5 to about 1:20, a thickening efficiency of about 1.0 or more.

In at least one embodiment, the present disclosure provides a method of making a lubricating oil composition including: 1) blending an oil with a copolymer, the copolymer having: a) an Mw(LS)/Mn(DRI) from about 1.5 to about 6; b) an Mw(LS) from about 20,000 to about 600,000 g/mol; c) a $g'_{vis}$ of from 0.7 to 0.98; d) an ethylene content of about 20 wt % to about 90 wt %; e) a shear stability index (30 cycles) of from about 3% to 80%; and f) a glass transition temperature Tg of from about −70° C. to about −20° C., such as from about −65° C. to about −35° C. and the resulting oil having a kinematic viscosity at 100° C. of from about 3 cSt to about 30 cSt.

In at least one embodiment, the lubrication oil composition can be prepared by heating the base stock oil followed by the addition of the polymer and optional additives. The composition is typically heated to a temperature of about 50° C. to about 150° C., or more typically about 50° C. to about 130° C., or even more typically about 50° C. to about 100° C.

The mixture is then stirred until complete dissolution of the polymer and is then cooled to room temperature. Conventional additives include, for example, pour point depressants, anti-wear agents, antioxidants, other viscosity-index improvers, dispersants, corrosion inhibitors, anti-foaming agents, detergents, rust inhibitors, friction modifiers, and the like.

Typical amounts are disclosed above in Table A.

Experimental

Polymer sample solutions were prepared by dissolving polymer in 1,2,4-trichlorobenzene (TCB, 99+% purity from Sigma-Aldrich) containing 2,6-di-tertbutyl-4-methylphenol (BHT, 99% from Aldrich) at 165° C. in a shaker oven for approximately 3 hours. Suitable concentration of polymer in solution was between 0.1 mg/ml to 0.9 mg/ml with a BHT concentration of 1.25 mg BHT/ml of TCB Diisobutylaluminum hydride (DIBAL-H) and triisobutyl aluminum (TIBAL) were purchased from Akzo Nobel and/or Sigma Aldrich and were used as received. 1,7-octadiene and 1,9-decadiene were purchased from Sigma Aldrich and purified by distillation from sodium metal under a nitrogen atmosphere prior to use. Synthetic procedures involving oxygen reactive species, such as organoaluminums and transition metals, were performed under inert atmosphere using glove box and Schlenk line techniques. Solvents used for the preparation of solutions for NMR spectroscopy were dried over 3 angstrom molecular sieves and sparged with nitrogen prior to use. $^1$H-NMR spectroscopic data were collected on homogenous solutions (ca. 0.01 M) using a Bruker 400 MHz spectrometer. The reported chemical shifts are relative to the residual protium at 7.15 for $D_6$-benzene.

Synthesis of AVTA

Preparation of isobutyldi(dec-9-en-1-yl)aluminum (AVTA-2/10). 1,9-Decadiene (500 mL, 2.71 mol) was loaded into a round bottomed flask. Diisobutylaluminum hydride (30.2 mL, 0.170 mol) was added dropwise over 15 minutes. The mixture was then placed in a metal block maintained at 110° C. After 30 minutes the solution had stabilized at a temperature of 104° C. The mixture was kept at this temperature for an additional 135 minutes at which time $^1$H-NMR spectroscopic data indicated that the reaction had progressed to the desired amount. The reaction mixture was cooled to ambient temperature. The excess 1,9-decadiene was removed by vacuum distillation at 44° C./120 mTorr over a 2.5 hours. The product was further distilled at 50° C./120 mTorr for an additional hour to ensure complete removal of all 1,9-decadiene. The isolated product was a clear colorless oil. $^1$H-NMR spectroscopic data suggests an average formulation of $Al(i-Bu)_{0.9}(decenyl)_{2.1}$ with an additional ca. 0.2 molar equivalent of what is presumed to be the triene formed by the insertion of 1,9-decadiene into an Al-decenyl bond followed by beta hydride elimination. Yield: 70.9 g.

Synthesis of Catalyst Complex $(QDA-1)HfMe_2$

Without being bound by theory, it is believed that suitable transition metal catalysts of the present disclosure can have high rates of olefin propagation and negligible or no chain termination via beta hydride elimination, beta methyl elimination, or chain transfer to monomer relative to the rate of chain transfer to the AVTA or other chain transfer agent (CTA) such as an aluminum alkyl if present. Pyridyldiamido and quinolinyldiamido pre-catalysts activated with non-coordinating activators such as dimethylanilinium tetrakis (perfluorophenyl)borate and/or dimethylanilinium tetrakis (perfluoronaphthyl)borate are suitable catalysts for the present disclosure. Suitable catalyst compounds included $(QDA-1)HfMe_2$ (see synthesis description and polymerization results below). The quinolinyldiamine ligand 2-(8-anilino-5,6,7,8-tetrahydronaphthalen-1-yl)-N-(2,6-diisopropylphenyl)quinolin-8-amine was prepared as described in US patent application 2018/0002352 A1.

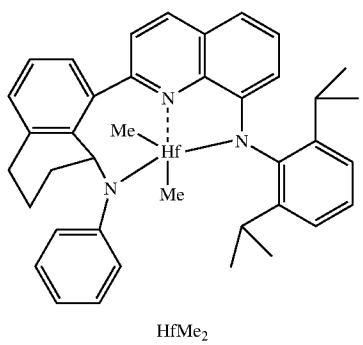

(QDA-1)

HfMe₂

Preparation of (QDA-1)HfMe₂. Toluene (80 mL) was added to 2-(8-anilino-5,6,7,8-tetrahydronaphthalen-1-yl)-N-(2,6-diisopropylphenyl)quinolin-8-amine (QDA-1 diamine, 5.500 g, 10.46 mmol) and Hf(NMe₂)₄ (3.865 g, 10.89 mmol) to form a clear orange solution after stirring for a few minutes. The mixture was placed on a metal block that was then warmed to 85° C. After 21 hours the solution was clear and red tinted. The flask was allowed to cool to near ambient temperature and AlMe₃ (5.279 g, 73.23 mmol) was added quickly. The mixture became a darker red. After 7 hours the volatiles were removed overnight by evaporation with a stream of nitrogen. The resulting orange solid was crushed with a spatula and toluene (5 mL) was added to form a slurry. The slurry was stirred for 30 minutes then pentane (60 mL) was added. The suspension was stirred for 3 hours. The solid was then collected on a frit and washed with cold pentane (2×30 mL) to afford the product as an orange solid. ¹H-NMR spectroscopic data indicated product (QDA-1)HfMe₂ of acceptable purity. Yield: 6.93 g, 90.5%.

GPC 3D Procedure

In at least one embodiment, the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Gel Permeation Chromatography with Three Detectors (GPC-3D)

$M_w$, $M_n$ and $M_w/M_n$ are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 micron Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 mg/ml to 2.0 mg/ml, with lower concentrations being used for higher molecular weight samples. Prior to running each sample, the DRI detector and the viscometer are purged. Flow rate in the apparatus is then increased to 0.5 ml/minute, and the DRI is allowed to stabilize for 8 hours before injecting the first sample. The LS laser is turned on at least 1 hour to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in g/mol, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Agilent viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'vis = \frac{[\eta]_{avg}}{kM_v^\alpha}$$

$M_V$ is the viscosity-average molecular weight based on molecular weights determined by LS analysis, while a and K are as calculated in the published in literature (T. Sun, P. Brant, R. R. Chance, and W. W. Graessley, Macromolecules, Volume 34, Number 19, pp. 6812-6820, (2001)), except that for purposes of this invention and claims thereto, α=0.695+(0.01*(wt. fraction propylene)) and K=0.000579−(0.0003502*(wt. fraction propylene)) for ethylene-propylene copolymers and ethylene-propylene-diene terpolymers, α=0.695 and K=0.000579 for ethylene polymers, α=0.705 and K=0.0002288 for propylene polymers, α=0.695 and K=0.000181 for butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

All molecular weights are weight average unless otherwise noted. All molecular weights are reported in g/mol unless otherwise noted.

Differential Scanning Calorimetry (DSC)

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q200 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the *Polymer Handbook*, Fourth Edition, published by John Wiley and Sons, New York 1999, provided; however, that a value of 207 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of the polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Melt Flow Rates. All melt flow rates (MFR) were determined using ASTM D1238 at 2.16 kg and 230° C. High load melt flow rates (MFR HL) were determined using ASTM D1238 at 21.6 kg and 230° C. Measurements took place using ethylene-propylene copolymers having the additives listed below.

Small Amplitude Oscillatory Shear (SAOS). Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting compression-molded sample of resin (polymer composition) onto the parallel plates. To determine the samples' viscoelastic behavior, frequency sweeps in the range from 0.01 to 385 rad/s were carried out at a temperature of 190° C. under constant strain of 10%. A nitrogen stream was circulated through the sample oven to minimize chain extension or cross-linking during the experiments. A sinusoidal shear strain is applied to the material. If the strain amplitude is sufficiently small the material behaves linearly. As those of ordinary skill in the art will be aware, the resulting steady-state stress will also oscillate sinusoidally at the same frequency but will be shifted by a phase angle δ with respect to the strain wave. The stress leads the strain by δ. For purely elastic materials, δ=0° (stress is in phase with strain) and for purely viscous materials, δ=90° (stress leads the strain by 90° although the stress is in phase with the strain rate). For viscoelastic materials, 0<δ<90. Complex viscosity, loss modulus (G") and storage modulus (G') as function of frequency are provided by the small amplitude oscillatory shear test. Dynamic viscosity is also referred to as complex viscosity or dynamic shear viscosity. The phase or the loss angle δ, is the inverse tangent of the ratio of G" (shear loss modulus) to G' (shear storage modulus).

Shear Thinning Ratio: Shear-thinning is a rheological response of polymer melts, where the resistance to flow (viscosity) decreases with increasing shear rate. The complex shear viscosity is generally constant at low shear rates (Newtonian region) and decreases with increasing shear rate. In the low shear-rate region, the viscosity is termed the zero shear viscosity, which is often difficult to measure for polydisperse and/or LCB polymer melts. At the higher shear rate, the polymer chains are oriented in the shear direction, which reduces the number of chain entanglements relative to their un-deformed state. This reduction in chain entanglement results in lower viscosity. Shear thinning is characterized by the decrease of complex dynamic viscosity with increasing frequency of the sinusoidally applied shear. Shear thinning ratio is defined as a ratio of the complex shear viscosity at frequency of 0.1 rad/sec to that at frequency of 100 rad/sec. The onset of shear thinning is defined as a frequency at which the complex viscosity start to deviate from Newtonian region (complex viscosity is independent of shear rate). For some long chain branching ethylene copolymer, no Newtonian flow region is observed in the testing frequency range. In this case, the onset of shear thinning is below 0.01 rad/sec (the lower limit of frequency tested).

Ethylene wt. % is determined using FTIR according to ASTM D3900.

Polymerization

The following describes the general polymerization procedure used for the examples. Polymerizations were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. All flow rates of liquid were controlled using Coriolis mass flow controller (Quantim series from Brooks). Ethylene and $H_2$ flowed as a gas under its own pressure through a Brooks flow controller. Monomers (e.g., ethylene and propylene) and $H_2$ feeds were combined into one stream and then mixed with a pre-chilled isohexane stream that had been cooled to at least 0° C. The mixture was then fed to the reactor through a single line. Scavenger solution (when used) was also added to the combined solvent and monomer stream just before it entered the reactor to further reduce any catalyst poisons. Similarly, catalyst solution was fed to the reactor using an ISCO syringe pump through a separated line. Solution of the chain transfer agent (e.g., AVTA 2/10) was fed into reactor through a separated line using a metering pump.

Isohexane (used as solvent) and monomers (e.g., ethylene and propylene) were purified over beds of alumina and molecular sieves. Toluene for preparing catalyst solutions was purified by the same technique.

An isohexane solution of tri-n-octyl aluminum (TNOA) (25 wt % in hexane, Sigma Aldrich) was used as scavenger solution. The (QDA-1)HfMe$_2$ catalyst was activated with N,N-dimethyl anilinium tetrakis (pentafluorophenyl) borate at a molar ratio of about 1:1 in 900 ml of toluene. The chain transfer agent was also diluted using toluene.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

The detailed polymerization process conditions and some characteristic properties are listed in Table 1 for Samples 1-15. The scavenger feed rate (when used) was adjusted to improve the catalyst efficiency and the feed rate varied from 0 (no scavenger) to 15 mol/min. The catalyst feed rates may also be adjusted according to the level of impurities in the system to reach the targeted conversions listed. All the reactions were carried out at a pressure of about 2.4 MPa/g unless otherwise mentioned. Samples C1 to C8 are comparative, linear OCPs produced in different processes.

TABLE 1

| Sample # | 1 | 2 | 3 | 4 | 5 |
|---|---|---|---|---|---|
| Polymerization temperature (° C.) | 125 | 120 | 120 | 120 | 100 |
| Ethylene feed rate (g/min) | 4.52 | 4.52 | 4.52 | 4.52 | 4.52 |
| Propylene feed rate (g/min) | 6.00 | 6.00 | 6.00 | 6.00 | 6.00 |
| H2 feed rate (Scc/min) | | | | | 10.00 |
| Isohexane feed rate (g/min) | 54.0 | 54.0 | 54.0 | 54.0 | 56.7 |
| Catalyst feed rate (mol/min) | 1.821E−07 | 1.821E−07 | 1.821E−07 | 1.821E−07 | 1.413E−07 |
| Aluminum vinyl transfer agent (AVTA) | AVTA 2/10 | AVTA 2/10 | AVTA 2/10 | AVTA 2/10 | AVTA 2/10 |
| AVTA feed rate (mol/min) | 3.85E−05 | 7.69E−05 | 1.15E−04 | 1.54E−04 | 1.97E−05 |
| Yield (g/min) | 8.37 | 8.46 | 7.95 | 7.81 | 9.69 |
| Conversion (%) | 79.5% | 80.4% | 75.5% | 74.2% | 92.0% |
| Catalyst productivity (kg Poly/Kg cat) | 62,766 | 63,441 | 59,598 | 58,529 | 93,598 |
| MFR (g/10 min) | | | 0.37 | 2.12 | 5.86 |
| MFR HL (g/10 min) | 2.56 | 7.84 | 33.17 | | |
| Mn_DRI (g/mol) | 110,065 | 69,916 | 44,252 | 32,570 | 56,439 |
| Mw_DRI (g/mol) | 291,362 | 203,273 | 146,524 | 114,642 | 122,754 |
| Mz_DRI (g/mol) | 650,375 | 482,990 | 450,601 | 360,284 | 215,650 |
| MWD (DRI) | 2.65 | 2.91 | 3.31 | 3.52 | 2.17 |
| Mw(LS)/Mn(DRI) | 3.03 | 3.20 | 3.42 | 3.74 | 2.08 |
| Mn_LS (g/mol) | 127,457 | 80,368 | 52,026 | 38,786 | 60,647 |
| Mw_LS (g/mol) | 333,375 | 223,690 | 151,201 | 121,667 | 117,370 |

TABLE 1-continued

| | | | | | |
|---|---|---|---|---|---|
| Mz_LS (g/mol) | 884,497 | 707,027 | 527,483 | 525,928 | 187,851 |
| GPC.g'vis | 0.909 | 0.867 | 0.839 | 0.83 | 0.944 |
| Ethylene content (wt %) | 51.6% | 50.8% | 52.8% | 52.9% | 44.1% |
| Complex shear viscosity at 0.1 rad/sec and 190° C. (Pa s) | 616,204 | 276,259 | 73,527 | 20,653 | 5,618 |
| Complex shear viscosity at 100 rad/sec and 190° C. (Pas) | 4,999 | 2,875 | 1,442 | 806 | 1,174 |
| Shear thinning ratio | 123.3 | 96.1 | 51.0 | 25.6 | 4.8 |

| Sample # | 6 | 7 | 8 | 9 | 10 |
|---|---|---|---|---|---|
| Polymerization temperature (° C.) | 120 | 120 | 100 | 100 | 120 |
| Ethylene feed rate (g/min) | 4.52 | 4.52 | 4.52 | 4.52 | 4.52 |
| Propylene feed rate (g/min) | 6.00 | 6.00 | 6.00 | 6.00 | 6.00 |
| H2 feed rate (Scc/min) | | | 10.00 | 10.00 | |
| Isohexane feed rate (g/min) | 56.7 | 56.7 | 56.7 | 56.7 | 54.0 |
| Catalyst feed rate (mol/min) | 1.130E−07 | 1.130E−07 | 1.130E−07 | 1.130E−07 | 3.532E−08 |
| Aluminum vinyl transfer agent (AVTA) | AVTA 2/10 | AVTA 3/10 | AVTA 3/10 | AVTA 3/10 | AVTA 3/10 |
| AVTA feed rate (mol/min) | 3.93E−05 | 5.90E−05 | 1.59E−05 | 3.18E−05 | 7.94E−05 |
| Yield (g/min) | 8.14 | 7.97 | 9.90 | 9.82 | 5.30 |
| Conversion (%) | 77.3% | 75.7% | 94.0% | 93.3% | 50.4% |
| Catalyst productivity (kg Poly/Kg cat) | 98,338 | 96,314 | 119,577 | 118,641 | 205,008 |
| MFR (g/10 min) | | | 6.13 | 4.34 | |
| MFR HL (g/10 min) | 4.14 | 5.59 | | | 6.01 |
| Mn_DRI (g/mol) | 112,387 | 73,546 | 63,971 | 58,396 | 61,011 |
| Mw_DRI (g/mol) | 299,527 | 244,885 | 132,717 | 124,107 | 183,882 |
| Mz_DRI (g/mol) | 686,795 | 701,637 | 249,459 | 219,150 | 511,171 |
| MWD (DRI) | 2.67 | 3.33 | 2.07 | 2.13 | 3.01 |
| Mw(LS)/Mn(DRI) | 2.99 | 3.42 | 1.99 | 2.12 | 3.29 |
| Mn_LS (g/mol) | 132,660 | 91,653 | 70,349 | 71,034 | 73,711 |
| Mw_LS (g/mol) | 336,254 | 251,553 | 127,431 | 123,803 | 200,634 |
| Mz_LS (g/mol) | 869,963 | 656,827 | 209,634 | 212,039 | 577,943 |
| GPC.g'vis | 0.878 | 0.847 | 0.947 | 0.93 | 0.826 |
| Ethylene (wt %) | 51.2% | 51.8% | 44.0% | 45.1% | 65.8% |
| Complex shear viscosity at 0.1 rad/sec and 190° C. (Pa s) | 537,777 | 383,789 | 6,211 | 261,021 | 296,742 |
| Complex shear viscosity at 100 rad/sec and 190° C. (Pas) | 4,083 | 3,153 | 1,239 | 2,799 | 2,435 |
| Shear thinning ratio | 131.7 | 121.7 | 5.0 | 93.3 | 121.9 |

| Sample # | 11 | 12 | 13 | 14 | 15 |
|---|---|---|---|---|---|
| Polymerization temperature (° C.) | 120 | 120 | 120 | 120 | 120 |
| Ethylene feed rate (g/min) | 4.52 | 6.79 | 6.79 | 6.79 | 6.79 |
| Propylene feed rate (g/min) | 6.00 | 5.00 | 5.00 | 5.00 | 5.00 |
| Isohexane feed rate (g/min) | 54.0 | 56.7 | 56.7 | 56.7 | 56.7 |
| Catalyst feed rate (mol/min) | 3.532E−08 | 1.275E−07 | 1.275E−07 | 1.214E−07 | 1.214E−07 |
| Aluminum vinyl transfer agent (AVTA) | AVTA 3/10 | AVTA 2/10 | AVTA 2/10 | AVTA 2/10 | AVTA 2/10 |
| AVTA feed rate (mol/min) | 6.35E−05 | 7.69E−05 | 1.54E−04 | 1.51E−04 | 3.01E−04 |
| Yield (g/min) | 5.71 | 7.24 | 5.37 | 7.86 | 5.18 |
| Conversion (%) | 54.2% | 61.4% | 48.0% | 66.7% | 43.9% |
| Catalyst productivity (kg Poly/Kg cat) | 220,666 | 77,489 | 57,514 | 88,385 | 58,239 |
| MFR (g/10 min) | | | | 14.51 | 76.67 |
| MFR HL (g/10 min) | 1.74 | 0.68 | 11.02 | | |
| Mn_DRI (g/mol) | 80,804 | 60,268 | 34,582 | 38,426 | 13,246 |
| Mw_DRI (g/mol) | 241,476 | 239,065 | 133,496 | 126,327 | 37,456 |
| Mz_DRI (g/mol) | 619,367 | 650,533 | 441,116 | 379,361 | 88,609 |
| MWD (DRI) | 2.99 | 3.97 | 3.86 | 3.29 | 2.83 |
| Mw(LS)/Mn(DRI) | 3.28 | 4.16 | 4.03 | 3.63 | 2.85 |
| Mn_LS (g/mol) | 91,184 | 77,132 | 40,410 | 44,082 | 14,297 |

TABLE 1-continued

| | | | | | |
|---|---|---|---|---|---|
| Mw_LS (g/mol) | 264,664 | 250,457 | 139,408 | 139,541 | 37,722 |
| Mz_LS (g/mol) | 790,193 | 701,030 | 547,353 | 576,677 | 152,111 |
| GPC.g'vis | 0.852 | 0.863 | 0.803 | 0.798 | 0.851 |
| Ethylene (wt %) | 63.4% | 74.8% | 80.4% | 72.4% | 83.4% |
| Complex shear viscosity at 0.1 rad/sec and 190° C. (Pa s) | 540,489 | 778,919 | 168,070 | 128,608 | 717 |
| Complex shear viscosity at 100 rad/sec and 190° C. (Pas) | 3,648 | 4,740 | 1,898 | 1,631 | 147 |
| Shear thinning ratio | 148.2 | 164.3 | 88.6 | 78.9 | 4.9 |

| Sample # | 16 | 17 | 18 | 19 | 20 |
|---|---|---|---|---|---|
| Polymerization temperature (° C.) | 120 | 120 | 120 | 120 | 120 |
| Ethylene feed rate (g/min) | 6.79 | 6.79 | 4.52 | 4.52 | 6.79 |
| Propylene feed rate (g/min) | 5.00 | 5.00 | 6.00 | 6.00 | 5.00 |
| Isohexane feed rate (g/min) | 54.0 | 54.0 | 54.0 | 54.0 | 54.0 |
| Catalyst feed rate (mol/min) | 1.214E−07 | 1.214E−07 | 1.821E−07 | 1.821E−07 | 6.373E−08 |
| Aluminum vinyl transfer agent (AVTA) | AVTA 2/10 | AVTA 2/10 | AVTA 2/10 | AVTA 2/10 | AVTA 2/10 |
| AVTA feed rate (mol/min) | 1.14E−04 | 2.28E−04 | 1.15E−04 | 7.69E−05 | 7.42E−05 |
| Yield (g/min) | 9.28 | 7.67 | 7.84 | 7.51 | 8.58 |
| Conversion (%) | 78.7% | 65.1% | 74.5% | 71.3% | 72.8% |
| Catalyst productivity (kg Poly/Kg cat) | 104,357 | 86,304 | 58,792 | 56,305 | 183,792 |
| MFR (g/10 min) | | | 1.25 | 1.29 | |
| MFR HL (g/10 min) | 2.92 | 89.23 | 77.35 | 12.77 | 1.04 |
| Mn_DRI (g/mol) | 59,168 | 30,463 | 39,272 | 48,606 | 80,610 |
| Mw_DRI (g/mol) | 199,080 | 98,121 | 114,259 | 171,465 | 227,582 |
| Mz_DRI (g/mol) | 573,246 | 311,211 | 293,536 | 491,211 | 590,354 |
| MWD (DRI) | 3.36 | 3.22 | 2.91 | 3.53 | 2.82 |
| Mw(LS)/Mn(DRI) | 3.70 | 3.39 | 3.02 | 3.58 | 3.53 |
| Mn_LS (g/mol) | 57,306 | 28,261 | 45,600 | 54,908 | 96,680 |
| Mw_LS (g/mol) | 218,799 | 103,156 | 118,723 | 174,061 | 284,477 |
| Mz_LS (g/mol) | 722,114 | 407,116 | 322,311 | 483,585 | 943,205 |
| GPC.g'vis | 0.786 | 0.812 | 0.822 | 0.837 | 0.813 |
| Ethylene (wt %) | 69.2% | 74.2% | 52.9% | 53.9% | 65.4% |
| Complex shear viscosity at 0.1 rad/sec and 190° C. (Pa s) | 357,000 | 33,175 | 33,093 | 207,534 | 741,234 |
| Complex shear viscosity at 100 rad/sec and 190° C. (Pas) | 2,668 | 959 | 1,086 | 2,327 | 4,251 |
| Shear thinning ratio | 133.8 | 34.6 | 30.5 | 89.2 | 174.4 |

| Sample # | 21 | 22 | 23 | 24 | 25 |
|---|---|---|---|---|---|
| Polymerization temperature (° C.) | 120 | 120 | 120 | 120 | 120 |
| Ethylene feed rate (g/min) | 4.52 | 4.52 | 6.22 | 6.22 | 6.22 |
| Propylene feed rate (g/min) | 6.00 | 6.00 | 5.00 | 5.00 | 5.00 |
| Isohexane feed rate (g/min) | 54.0 | 54.0 | 56.0 | 55.5 | 55.0 |
| Catalyst feed rate (mol/min) | 9.104E−08 | 1.821E−07 | 9.104E−08 | 9.104E−08 | 9.104E−08 |
| Aluminum vinyl transfer agent (AVTA) | AVTA 2/10 | AVTA 2/10 | AVTA 2/10 | AVTA 2/10 | AVTA 2/10 |
| AVTA feed rate (mol/min) | 1.14E−04 | 7.69E−05 | 7.42E−05 | 7.42E−05 | 7.42E−05 |
| TNOA feed rate (mol/min) | | | 5.47E−06 | 4.10E−06 | 2.74E−06 |
| Yield (g/min) | 6.51 | 8.01 | 8.65 | 9.06 | 8.78 |
| Conversion (%) | 61.8% | 76.2% | 77.1% | 80.8% | 78.2% |
| Catalyst productivity (kg Poly/Kg cat) | 97,610 | 60,098 | 129,709 | 135,909 | 131,665 |
| MFR (g/10 min) | 0.38 | 0.13 | | | |
| MFR HL (g/10 min) | 32.95 | 18.52 | 7.33 | 1.79 | 1.79 |
| Mn_DRI (g/mol) | 41,754 | 47,828 | 52,559 | 52,285 | 48,854 |
| Mw_DRI (g/mol) | 118,810 | 145,458 | 169,460 | 176,489 | 192,309 |
| Mz_DRI (g/mol) | 302,427 | 376,275 | 455,419 | 444,702 | 596,454 |
| MWD (DRI) | 2.85 | 3.04 | 3.22 | 3.38 | 3.94 |

TABLE 1-continued

| | | | | | |
|---|---|---|---|---|---|
| Mw(LS)/Mn(DRI) | 3.07 | 3.20 | 3.64 | 4.26 | 4.45 |
| Mn_LS (g/mol) | 44,903 | 60,646 | 65,172 | 73,132 | 67,400 |
| Mw_LS (g/mol) | 128,158 | 153,204 | 191,492 | 222,534 | 217,186 |
| Mz_LS (g/mol) | 455,161 | 346,424 | 530,249 | 853,232 | 631,552 |
| GPC.g'vis | 0.817 | 0.853 | 0.828 | 0.835 | 0.833 |
| Ethylene (wt %) | 58.3% | 51.8% | 65.9% | 66.1% | 65.6% |
| Complex shear viscosity at 0.1 rad/sec and 190° C. (Pa s) | 64,226 | 133,167 | 453,450 | 665,597 | 701,582 |
| Complex shear viscosity at 100 rad/sec and 190° C. (Pas) | 1,163 | 2,032 | 3,101 | 3,779 | 3,623 |
| Shear thinning ratio | 55.2 | 65.5 | 146.2 | 176.1 | 193.6 |

| Sample # | 26 | 27 | 28 |
|---|---|---|---|
| Polymerization temperature (° C.) | 124 | 120 | 120 |
| Ethylene feed rate (g/min) | 6.22 | 6.79 | 4.52 |
| Propylene feed rate (g/min) | 5.00 | 5.00 | 6.00 |
| Isohexane feed rate (g/min) | 54.5 | 56.0 | 56.0 |
| Catalyst feed rate (mol/min) | 9.104E−08 | 6.373E−08 | 1.092E−07 |
| Aluminum vinyl transfer agent (AVTA) | AVTA 2/10 | AVTA 2/10 | AVTA 2/10 |
| AVTA feed rate (mol/min) | 7.42E−05 | 7.42E−05 | 1.14E−04 |
| TNOA feed ratee (mol/min) | 1.37E−06 | | |
| Yield (g/min) | 8.47 | 8.08 | 6.94 |
| Conversion (%) | 75.5% | 68.5% | 65.9% |
| Catalyst productivity (kg Poly/Kg cat) | 127,026 | 173,097 | 86,765 |
| MFR (g/10 min) | | | 0.87 |
| MFR HL (g/10 min) | 2.00 | 0.83 | 61.72 |
| Mn_DRI (g/mol) | 61,863 | 68,848 | 37,818 |
| Mw_DRI (g/mol) | 181,061 | 225,748 | 106,601 |
| Mz_DRI (g/mol) | 436,689 | 633,446 | 254,247 |
| MWD (DRI) | 2.93 | 3.28 | 2.82 |
| Mw(LS)/Mn(DRI) | 3.72 | 4.19 | 3.23 |
| Mn_LS (g/mol) | 77,859 | 91,338 | 45,587 |
| Mw_LS (g/mol) | 230,205 | 288,774 | 122,189 |
| Mz_LS (g/mol) | 868,608 | 1,031,881 | 345,914 |
| GPC.g'vis | 0.852 | 0.823 | 0.852 |
| Ethylene (wt %) | 66.5% | 70.7% | 56.9% |
| Complex shear viscosity at 0.1 rad/sec and 190° C. (Pa s) | 755,591 | 894,442 | 34,598 |
| Complex shear viscosity at 100 rad/sec and 190° C. (Pas) | 3,679 | 4,335 | 856 |
| Shear thinning ratio | 205.4 | 206.3 | 40.4 |

| Sample | 29 | 30 | 31 | 32 | 33 | 34 |
|---|---|---|---|---|---|---|
| Polymerization temperature (° C.) | 120 | 120 | 120 | 120 | 120 | 120 |
| Ethylene feed rate (g/min) | 5.99 | 5.99 | 5.99 | 6.79 | 6.79 | 6.79 |
| Propylene feed rate (g/min) | 6.00 | 6.00 | 6.00 | 5.00 | 5.00 | 5.00 |
| Isohexane feed rate (g/min) | 56.0 | 55.5 | 55.0 | 56.0 | 55.5 | 55.0 |
| Catalyst feed rate (mol/min) | 9.10E−08 | 9.10E−08 | 9.10E−08 | 9.10E−08 | 9.10E−08 | 9.10E−08 |
| AVTA feed rate (mol/min) | 7.42E−05 | 7.42E−05 | 7.42E−05 | 7.42E−05 | 7.42E−05 | 7.42E−05 |
| Aluminum vinyl transfer agent (AVTA) | AVTA 2/10 | AVTA 2/10 | AVTA 2/10 | AVTA 2/10 | AVTA 2/10 | AVTA 2/10 |
| TNOA feed rate (mol/min) | 5.47E−06 | 4.10E−06 | 2.74E−06 | 5.47E−06 | 4.10E−06 | 2.74E−06 |
| Yield (g/min) | 8.9 | 8.7 | 8.8 | 9.2 | 9.1 | 8.6 |
| Conversion (%) | 74.0 | 72.5 | 73.1 | 77.7 | 76.9 | 73.3 |
| Catalyst productivity (kg Poly/Kg cat) | 133,046 | 130,346 | 131,509 | 137,284 | 136,009 | 129,559 |
| MFR (g/10 min) | TLTM | TLTM | TLTM | TLTM | TLTM | TLTM |
| MFR HL (g/10 min) | 2.73 | 2.2 | 2.13 | 2.05 | 1.71 | 1.33 |
| Mn_DRI (g/mol) | 66,161 | 76,368 | 60,705 | 65,534 | 44,515 | 62,221 |
| Mw_DRI (g/mol) | 192,593 | 214,855 | 197,955 | 213,264 | 190,435 | 191,405 |
| Mz_DRI (g/mol) | 501,219 | 529,400 | 530,609 | 648,380 | 554,084 | 510,330 |
| MWD (DRI) | 2.91 | 2.81 | 3.26 | 3.25 | 4.28 | 3.08 |
| Mw(LS)/Mn(DRI) | 3.60 | 3.63 | 4.17 | 3.77 | 5.16 | 3.85 |
| Mn_LS (g/mol) | 82,892 | 103,463 | 82,916 | 85,586 | 51,864 | 75,335 |

TABLE 1-continued

| Mw_LS (g/mol) | 238,104 | 277,062 | 253,371 | 247,310 | 229,748 | 239,242 |
|---|---|---|---|---|---|---|
| Mz_LS (g/mol) | 763,843 | 894,318 | 906,474 | 726,978 | 826,914 | 848,769 |
| GPC.g'vis | 0.836 | 0.848 | 0.841 | 0.814 | 0.843 | 0.839 |
| Ethylene content (wt %) | 61.40% | 61.92% | 61.48% | 68.64% | 69.14% | 69.13% |
| Complex shear viscosity at 0.1 rad/sec and 190° C. (Pa s) | 512,026 | 517,526 | 531,959 | 596,624 | 672,022 | 695,883 |
| Complex shear viscosity at 100 rad/sec and 190° C. (Pas) | 3446.95 | 3657.29 | 3548.81 | 3738.28 | 4026.03 | 3985.07 |
| Shear thinning ratio | 148.5 | 141.5 | 149.9 | 159.6 | 166.9 | 174.6 |

| VI additive # | C1 | C2 |
|---|---|---|
| Complex viscosity at 100 rad/s (Pa s) | 1449.08 | 682.73 |
| Complex viscosity at 0.1 rad/s (Pa s) | 9529.65 | 2637.63 |
| Shear thinning ratio (—) | 6.58 | 3.86 |
| Mn_DRI (g/mol) | 51,677 | 41,413 |
| Mw_DRI (g/mol) | 126,986 | 92,699 |
| Mz_DRI (g/mol) | 218,910 | 154,003 |
| MWD (—) | 2.46 | 2.24 |
| Mn_LS (g/mol) | 52,465 | 44,274 |
| Mw_LS (g/mol) | 119,715 | 85,020 |
| Mz_LS (g/mol) | 194,921 | 130,515 |
| $g'_{vis}$ (—) | 0.999 | 1.010 |
| Ethylene content by FTIR (wt. %) | 42.8 | 45.6 |

Characterization results of selected ethylene-propylene copolymers are shown in Table 1. Linear ethylene copolymers were used in the formulation of CF-1 and CF-2 as comparative formulation examples, where C1 and C2 are commercial linear EP copolymers respectively. The data for the comparative samples are listed in Table 2. The use of AVTA leads to the formation of the EP copolymers at high molecular weight with high levels of branching. It is believed that an increase of AVTA amount used during the process would increase the branching. Evidence of long-chain branching in the inventive examples 1-34, is found in the both the branching index ($g'_{vis}$) and shear thinning ratio. The branching in index of the comparative, linear OCP samples C1 and C2 are near unity whereas the branching index of the inventive examples 1-34 are significantly lower. The shear thinning ratios of the inventive examples are also significantly higher than that of the comparative, linear examples.

The examples in Table 1 were formulated and tested as viscosity modifiers in lubricant oils. The polymer samples were blended at in a Group I diluent oil to a concentration that yielded a viscosity of approximately 15 cSt. The results of the testing are shown in Table 2.

Shear stability index (SSI) is determined according to ASTM D6278 at 30 cycles using using a Kurt Orbahn diesel injection apparatus.

High temperature and high shear (HTHS) is measured at 150° C. and $10^6$ 1/s according to ASTM D4683 in a Tapered Bearing Simulator.

Thickening efficiency (TE) is relative a measure of the polymer to increase viscosity of an oil and is defined as: TE=2/c×ln((KV100 of polymer+oil)/(KV100 of oil))/ln(2) where c is the concentration of the polymer. By definition, a theoretical reference copolymer that will double the reference oil viscosity at 100° C. at a concentration of 1.0 wt % in the oil has a TE=2.0.

KV is Kinematic Viscosity as determined by ASTM D445 (KV40 is determined at 40° C., and KV100 is determined at 100° C.).

The benefit of long-chain branching on temporary shear thinning is illustrated in FIG. 1 as HTHS viscosity across a range of SSI for the long-chain branched AVTA EP copolymers and linear OCPs as a comparative reference. HTHS is a measure of shear-thinning behavior of the polymer in oil. For lubricating oils exhibiting the same low shear viscosity (KV100), a lower measured HTHS viscosity indicates that the oil may yield reduced frictional losses in an operating engine and lead to increased fuel economy (see for example, W. van Dam, T. Miller, G. Parsons: Optimizing Low Viscosity Lubricants for Improved Fuel Economy in Heavy Duty Diesel Engines. SAE Paper 2011-01-1206). The lubricating oils prepared with the inventive long chain branched EP samples show lower HTHS as compared to those prepared with linear OCPs.

TABLE 2

| Sample | Thickening Efficiency | Shear Stability Index (%) | HTHS at 150° C. (cP) |
|---|---|---|---|
| C1 | 2.31 | 39.4 | 3.69 |
| C2 | 1.74 | 24.4 | 3.84 |
| 20 | 3.97 | 58.1 | 3.14 |
| 21 | 2.09 | 34.8 | 3.59 |
| 22 | 2.49 | 41.9 | 3.51 |
| 23 | 2.99 | 47.1 | 3.43 |
| 24 | 3.36 | 54.4 | 3.22 |
| 25 | 3.36 | 53.6 | 3.20 |
| 26 | 3.35 | 54.7 | 3.17 |
| 27 | 3.69 | 53.0 | 3.20 |
| 28 | 2.04 | 31.6 | 3.64 |

At similar TE and SSI (see Table 2), the inventive examples exhibited lower HTHS compared to Formulation Examples C-1 and/or C-2.

Overall, poly(ethylene-propylene) copolymers with long chain branching were made via chain coordinated transfer polymerization (CCTP) in the presence of aluminum vinyl transfer agents (AVTA) in order to introduce a controlled level of long chain branching. The branched AVTA EP products show the presence of branching as suggested by the GPC-3D and rheology. The branched AVTA EP shows enhanced high temperature high shear (HTHS) viscosity versus existing linear olefin copolymer (OCP) grades. The thickening efficiency and mechanical shear stability are comparable with existing linear OCP products. The branched OCPs of the present disclosure can provide improved fuel economy benefits over the commercial products with the potential to meet future specifications.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

Likewise, the term "comprising" is considered synonymous with the term "including" for purposes of United States law. Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The terms "a" and "the" as used herein are understood to encompass the plural as well as the singular.

Room temperature is about 23° C. unless otherwise noted.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A lubricant composition, comprising:
an oil and a long chain branched copolymer having:
shear stability index (30 cycles) of from about 2% to about 80%; and
a kinematic viscosity at 100° C. of from about 3 cSt to about 30 cSt,
wherein the copolymer has:
Mw(LS)/Mn(DRI) from about 1.5 to about 6;
a Mw(LS) from about 20,000 to about 600,000 g/mol;
a g'vis of from about 0.7 to about 0.98; and
an ethylene content of about 20 wt. % to about 90 wt. %; and
wherein the copolymer comprises a remnant of a metal hydrocarbenyl chain transfer agent, wherein the metal hydrocarbenyl chain transfer agent is represented by the formula:

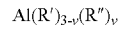

$$Al(R')_{3-v}(R'')_v$$

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

2. The composition of claim 1, wherein the copolymer has an ethylene content of about 30 wt % to about 80 wt %.

3. The composition of claim 1, wherein the copolymer has an ethylene content of about 40 wt % to about 75 wt %.

4. The composition of claim 1, wherein the copolymer has an Mw(LS)/Mn(DRI) from about 2.0 to about 5.0.

5. The composition of claim 1, wherein the kinematic viscosity at 100° C. is from about 6 cSt to about 28 cSt.

6. The composition of claim 1, wherein the kinematic viscosity at 100° C. is from about 7 cSt to about 25 cSt.

7. The composition of claim 1, wherein the copolymer has a shear stability index (30 cycles) of about 3% or greater.

8. The composition of claim 1, wherein the copolymer has a shear stability index (30 cycles) of about 20% or greater.

9. The composition of claim 1, wherein the copolymer has a shear stability index (30 cycles) of about 30% or greater.

10. The composition of claim 1, wherein the copolymer has a thickening efficiency of about 1 or greater.

11. The composition of claim 1, wherein the copolymer has a thickening efficiency of about 1.5 or greater.

12. The composition of claim 1, wherein the composition comprises about 0.01 wt % to about 20 wt % of the copolymer.

13. The composition of claim 1, wherein the composition comprises about 0.01 wt % to about 5 wt % of the copolymer.

14. The composition of claim 1, wherein the oil comprises a hydrocarbon, polyalphaolefin, alkyl esters of dicarboxylic acids, polyglycols, alcohols, polybutenes, alkylbenzenes, organic esters of phosphoric acids, polysilicone oils, or combinations thereof.

15. The composition of claim 1, wherein the composition has a high temperature, high shear (HTHS) viscosity of about 5 or less.

16. The composition of claim 1, further comprising at least one of a dispersant, a detergent, an antioxidant, an oiliness improver, as pour point depressant, a friction modifier, a wear modifier, an extreme pressure additive, a defoamer, a demulsifier, or a corrosion inhibitor.

17. The composition of claim 1, wherein the composition has a second copolymer having an ethylene content less than the ethylene content of the first copolymer.

18. The composition of claim 1, wherein the long chain branched ethylene copolymer has a shear thinning ratio greater than $8x\,e^{\wedge}(8x\,10^{\wedge}(-6)\,x\,w)$, where w is the Mw(LS) from light scattering GPC-3D.

19. The composition of claim 1, wherein the copolymer has a Heat of Fusion (J/g) less than 2.2x-110 where x is the wt % ethylene as measured by FTIR.

20. The composition of claim 1, wherein the copolymer is an ethylene propylene copolymer.

21. The composition of claim 1, wherein the copolymer was made from metal hydrocarbenyl chain transfer agent, wherein the metal hydrocarbenyl chain transfer agent is represented by formula:

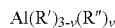

wherein each R', independently, is a $C_4$-$C_{10}$ hydrocarbyl group; each R", independently, is a $C_8$-$C_{10}$ hydrocarbenyl group having an end-vinyl group; and v is from 0.1 to 3.

22. The composition of claim 1, wherein the copolymer comprises a remnant of a metal hydrocarbenyl chain transfer agent, wherein the metal hydrocarbenyl chain transfer agent is represented by formula:

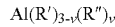

wherein each R', independently, is a $C_4$ hydrocarbyl group; each R", independently, is a $C_{10}$ hydrocarbenyl group having an end-vinyl group; and v is from 1 to 3.

23. The composition of claim 1, wherein the copolymer comprises a remnant of a metal hydrocarbenyl chain transfer agent, wherein the metal hydrocarbenyl chain transfer agent is represented by formula:

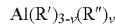

wherein each R', independently, is a $C_4$ hydrocarbyl group; each R", independently, is a $C_8$ hydrocarbenyl group having an end-vinyl group; and v is from 1 to 3.

24. A method of making a lubricant composition, comprising:
blending an oil with a long chain branched copolymer, the composition having:
a shear stability index (30 cycles) of from about 2% to about 80%; and
a kinematic viscosity at 100° C. of from about 3 cSt to about 30 cSt, and wherein the copolymer has:
a Mw(LS)/Mn(DRI) from about 1.5 to about 6;
a Mw(LS) from about 20,000 to about 600,000 g/mol;
a g'vis of from about 0.7 to about 0.98; and
an ethylene content of about 20 wt % to about 90 wt %,
and wherein the copolymer comprises a remnant of a metal hydrocarbenyl chain transfer agent, wherein the metal hydrocarbenyl chain transfer agent is represented by formula:

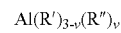

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

25. A method of lubricating an engine, comprising:
supplying to the engine a lubricant composition comprising an oil and a long chain branched copolymer having:
a shear stability index (30 cycles) of from about 2% to about 80%;
and a kinematic viscosity at 100° C. of from about 3 cSt to about 30 cSt;
wherein the copolymer has: a Mw(LS)/Mn(DRI) from about 1.5 to about 6;
a Mw(LS) from about 20,000 to about 600,000 g/mol;
a g'$_{vis}$ of from about 0.7 to about 0.98;
an ethylene content of about 20 wt % to about 90 wt %; and
wherein the copolymer comprises a remnant of a metal hydrocarbenyl chain transfer agent, wherein the metal hydrocarbenyl chain transfer agent is represented by formula:

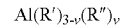

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

* * * * *